US008041888B2

(12) United States Patent
Rajan et al.

(10) Patent No.: US 8,041,888 B2
(45) Date of Patent: Oct. 18, 2011

(54) SYSTEM AND METHOD FOR LUN CLONING

(75) Inventors: Vijayan Rajan, Sunnyvale, CA (US);
Vinay Gupta, Sunnyvale, CA (US)

(73) Assignee: NetApp, Inc., Sunnyvale, CA (US)

( * ) Notice: Subject to any disclaimer, the term of this patent is extended or adjusted under 35 U.S.C. 154(b) by 557 days.

(21) Appl. No.: 10/772,822

(22) Filed: Feb. 5, 2004

(65) Prior Publication Data
US 2005/0177594 A1 Aug. 11, 2005

(51) Int. Cl.
G06F 12/00 (2006.01)
(52) U.S. Cl. ........ 711/112; 711/114; 711/161; 711/162; 707/624; 707/625; 707/638; 707/639
(58) Field of Classification Search .................. 711/112, 711/114, 161, 162; 707/624, 625, 638, 639
See application file for complete search history.

(56) References Cited

U.S. PATENT DOCUMENTS

| | | | |
|---|---|---|---|
| 4,156,907 A | 5/1979 | Rawlings et al. | |
| 4,399,503 A | 8/1983 | Hawley | |
| 4,570,217 A | 2/1986 | Allen et al. | |
| 4,598,357 A | 7/1986 | Swenson et al. | |
| 4,688,221 A | 8/1987 | Nakamura et al. | |
| 4,698,808 A | 10/1987 | Ishii | |
| 4,761,785 A | 8/1988 | Clark et al. | |
| 4,805,090 A | 2/1989 | Coogan | |
| 4,837,675 A | 6/1989 | Bean et al. | |
| 4,864,497 A | 9/1989 | Lowry et al. | |
| 4,896,259 A | 1/1990 | Jacobs et al. | |
| 4,899,342 A | 2/1990 | Potter et al. | |
| 4,989,206 A | 1/1991 | Dunphy, Jr. et al. | |
| 5,124,987 A | 6/1992 | Milligan et al. | |
| RE34,100 E | 10/1992 | Hartness | |
| 5,155,835 A | 10/1992 | Belsan | |
| 5,163,131 A | 11/1992 | Row et al. | |
| 5,202,979 A | 4/1993 | Hillis et al. | |
| 5,278,979 A | 1/1994 | Foster et al. | |
| 5,426,747 A | 6/1995 | Weinreb et al. | |
| 5,581,724 A | 12/1996 | Belsan et al. | |
| 5,819,292 A | 10/1998 | Hitz et al. | |
| 5,963,962 A | 10/1999 | Hitz et al. | |
| 6,038,570 A | 3/2000 | Hitz et al. | |
| 6,571,261 B1 * | 5/2003 | Wang-Knop et al. | 707/206 |

(Continued)

FOREIGN PATENT DOCUMENTS

WO    WO 89/10594    11/1989

OTHER PUBLICATIONS

Howard, John H., An Overview of the Andrew File System, Carnegie Mellon University, CMU-ITC-88-062, 1988.*

(Continued)

*Primary Examiner* — Sanjiv Shah
*Assistant Examiner* — Arpan P. Savla
(74) *Attorney, Agent, or Firm* — Cesari and McKenna, LLP

(57) ABSTRACT

A logical unit number (LUN) cloning technique separates data blocks referenced by a writable virtual disk (vdisk) from data blocks referenced only by a backing store to conserve storage resources of a storage system. The LUN cloning technique separates the writable vdisk data blocks from the backing store during periods of reduced processing activity and in a manner that does not interfere with storage service provided by the system.

37 Claims, 12 Drawing Sheets

U.S. PATENT DOCUMENTS

| | | | |
|---|---|---|---|
| 6,618,794 B1* | 9/2003 | Sicola et al. | 711/154 |
| 6,636,879 B1 | 10/2003 | Doucette et al. | |
| 6,665,815 B1 | 12/2003 | Goldstein et al. | |
| 6,792,518 B2* | 9/2004 | Armangau et al. | 711/162 |
| 6,907,505 B2* | 6/2005 | Cochran et al. | 711/162 |
| 7,165,156 B1* | 1/2007 | Cameron et al. | 711/162 |
| 2002/0083037 A1 | 6/2002 | Lewis et al. | |
| 2002/0091670 A1 | 7/2002 | Hitz et al. | |
| 2003/0158863 A1 | 8/2003 | Haskin et al. | |
| 2003/0182313 A1* | 9/2003 | Federwisch et al. | 707/200 |
| 2003/0182389 A1* | 9/2003 | Edwards | 709/213 |

OTHER PUBLICATIONS

U.S. Appl. No. 10/412,478, filed Apr. 11, 2003, Vijayan Rajan, Writable Read-Only Snapshots.

Common Internet File System (CIFS) Version: CIFS-Spec 0.9, Storage Networking Industry Association (SNIA), Draft SNIA CIFS Documentation Work Group Work-in-Progress, Revision Date: Mar. 26, 2001.

Fielding et al. (1999) Request for Comments (RFC) 2616, HTTP/1.1.

Akyurek, Sedat, *Placing Replicated Data to Reduce Seek Delays*, Department of Computer Science, University of Maryland, UMIACS-TR-91-121, CS-TR-2746, Aug. 1991.

Bitton, Dina, *Disk Shadowing*, Proceedings of the 14th VLDB Conference, LA, CA 1988.

Chaudhuri, Surajit, et al., *Self-Tuning Technology in Microsoft SQL Server*, Data Engineering Journal 22, 2 1999 pp. 20-27.

Chutani, Sailesh, et al., *The Episode File System*, In Proceedings of the USENIX Winter 1992.

Coyne, Robert A., et al., *Storage Systems for National Information Assets*, Proc. Supercomputing 92, Minneapolis, Nov. 1992, pp. 626-633.

Finlayson, Ross S., et al., *Log Files: An Extended File Service Exploiting Write-Once Storage* Department of Computer Science, Stanford University, Report No. STAN-CS-87-1177, Sep. 1987.

Gray, Jim, et al., *The Recovery Manager of the System R Database Manager*, ACM Computing Surveys, (13)2:223-242 1981.

Hecht, Matthew S., et al. *Shadowed Management of Free Disk Pages with a Linked List*, ACM Transactions on Database Systems, 8/4, Dec. 1983, pp. 503-514.

Howard, John, H. et al., *Scale and Performance in a Distributed File System*, Carnegie Mellon University, CMU-ITC-87-068, Aug. 1987.

Howard, John H., *An Overview of the Andrew File System*, Carnegie Mellon University, CMU-ITC-88-062 1988.

Howard, John, H. et al., *Scale and Performance in a Distributed File System*, ACM Trans. Computer System, 6(1), Feb. 1988 pp. 51-81.

Kazar, Michael L., et al., *DEcorum File System Architectural Overview*, USENIX Summer Conference, Anaheim, California, 1990.

Kemper, Alfons, et al., *Performance Tuning for SAP R/3*, Data Engineering Journal 22, 2 1999 pp. 33-40.

Kent, Jack et al., *Optimizing Shadow Recovery Algorithms*, IEEE Transactions on Software Engineering, 14( 2): 155-168, Feb. 1988.

Kistler, et al., *Disconnected Operation in the Coda File System*, ACM Transactions on Computer Systems, vol. 10, No. 1, Feb. 1992, pp. 3-25.

Lorie, Raymond, A. *Physical Integrity in a Large Segmented Database*, ACM Trans. Database Syst., vol. 2, Mar. 1977, pp. 91-104.

Ousterhout, John et al., *Beating the I/O Bottleneck: A Case for Log-Structured File Systems*, Technical Report, Computer Science Division, Electrical Engineering and Computer Sciences, University of California at Berkeley, Oct. 30, 1988.

Patterson, D., et al., *A Case for Redundant Arrays of Inexpensive Disks (RAID)*, Technical Report, CSD-87-391, Computer Science Division, Electrical Engineering and Computer Sciences, University of California at Berkeley 1987.

Patterson, D., et al., *A Case for Redundant Arrays of Inexpensive Disks (RAID)*, SIGMOD International Conference on Management of Data, Chicago, IL, USA, Jun. 1-3, 1988, SIGMOD Record (17)3:109-16 Sep. 1988.

Peterson, Zachary Nathaniel Joseph, *Data Placement for Copy-on-Write Using Virtual Contiguity*, University of CA, Santa Cruz, Master's Thesis for the Department of Science in Computer Science, Sep. 2002.

Quinlan, Sean, *A Cached WORM File System*, Software-Practice and Experience, 21(12):1289-1299 1991.

Rosenblum, Mendel, et al., *The LFS Storage Manager*, Computer Science Division, Electrical Engineering and Computer Sciences, Univ. of CA, presented at Summer '90 USENIX Technical Conference, Anaheim, CA Jun. 1990.

Rosenblum, Mendel, et al. *The Design and Implementation of a Log-Structured File System* Jul. 24, 1991 pp. 1-15.

Rosenblum, Mendel, *The Design and Implementation of a Log-Structured File System*, 1992 pp. 1-93.

Rosenblum, Mendel, et al., *The Design and Implementation of a Log-Structured File System*, In Proceedings of ACM Transactions on Computer Systems, (10)1:26-52, Feb. 1992.

Schiefer, Berni, et al., *DB2 Universal Database Performance Tuning*, Data Engineering Journal 22, Feb. 1999 pp. 12-19.

Seltzer, Margo I., et al., *Journaling Versus Soft Updates: Asynchronous Meta-Data Protection in File Systems*, Proceedings of 200 USENIX Annual Technical Conference, Jun. 18-23, 2000.

Shasha, Dennis, *Tuning Time Series Queries in Finance: Case Studies and Recommendations*, Data Engineering Journal 22, Feb. 1999 pp. 41-47.

Sidebotham, Bob, *Volumes: The Andrew File System Data Structuring Primitive*, EEUG Conference Proceedings, Manchester, UK, Autumn 1986.

Subramanian, Muralidhar, et al., *Performance Challenges in Object-Relational DBMSs*, Data Engineering Journal 22, Feb. 1999 pp. 28-32.

Weikum, Gerhard, et al., *Towards Self-Tuning Memory Management for Data Servers*, Data Engineering Journal 22, Feb. 1999 pp. 3-11.

West, Michael, et al. *The ITC Distributed File System: Prototype and Experience*, Carnegie-Mellon University, Technical Report CMU-ITC-040, Mar. 1985.

Zayas, Edward R., AFS-3 Programmer's Reference: Architectural Overview, Transarc Corporation, Pittsburgh, PA, 1.0 edition 1991.

Hutchinson N.C. et al, "Logical vs. Physical File System Backup" Usenix Association Proceedings of the 3rd Symposium on Operating Systems Design and Implemention. OSDI '99. (Published in: Operating Systems Review, OSR Special Issue—Winter 1998.) New Orleans, LA, Feb. 22-25, 1999, Symposium on Operating Systems, pp. 239-249, XP002194026.

International Search Report for International Application No. PCT/US2005/003217, Dec. 13, 2005, Authorized Officer Selma Harris.

Administration Guide found at http://www.openafs.org/pages/doc/AdminGuide/auagd010.htm, visited on Mar. 2, 2005.

Basilico, et al., *Error Correction System Using "Shadow Memory,"* IBM Technical Disclosure Bulletin, May 1984, pp. 5792-5793.

Bitton, Dina, *Disk Shadowing*, Proceedings of the 14th VLDB Conference, LA, CA (1988).

Blasgen, M.W. et al., *System R:An architectural Overview*,Reprinted from IBM Systems Journal vol. 20, No. 1, 1981 © 1981, 1999.

Borenstein, Nathaniel S., *CMU's Andrew project a retrospective*, Communications of ACM, (39)12, Dec. 1996.

Brown, Mark R. et al., *The Alpine file system*, ACM Transactions on Computing Systems, 3(4):261-293, Nov. 1985.

Chen, Peter M., et al., *An Evaluation of Redundant Arrays of Disks Using an Amdahl 5890* Performance Evaluation, pp. 74-85, 1990.

Chutani, Sailesh, et al., *The Episode file system*, In Proceedings of the USENIX Winter 1992.

Clark, B.E., et al., *Application System /400 Performance Characteristics*, IBM Systems Journal, 28(3): 407-423, 1989.

Data Sheet for the Check Point Software Technologies product Flood-Gate-1 (1997).

Dibble, Peter C., et al., Beyond Striping: The Bridge Multiprocessor File System, Computer Science Department, University of Rochester, Aug. 11, 1989.

Gait, Jason, *Phoenix: A Safe In-Memory File System*. Communications of the ACM, 33(1):81-86, Jan. 1990.

Hartman, John H. et al., *Performance Measurements of a Multiprocessor Sprite Kernel*, Proceedings of the USENIX Conference, 1990.

Hitz, Dave et al., *File System Design for an NFS File Server Appliance*, Technical Report 3002, Rev. C395, presented Jan. 19, 1994.

Howard, John H, et al. *Scale and Performance in a Distributed File System*, Carnegie Mellon University, CMU-ITC-87-068, Aug. 5, 1987.

Howard, John, H. et al., *Scale and performance in a distributed file system*, ACM Trans. Computer. System., 6(1), Feb. 1988 pp. 51-81.

Isomaki, Markus, *Differentiated Service for the Internet*, Department of Technical Physics and Mathematics, May 9, 1998.

Kazar, Michael L., et al., *Decorum File System Architectural Overview*, USENIX Summer Conference, Anaheim, California, 1990.

Lorie, Raymond, A, *Physical integrity in a large segmented database*, ACM Trans. Database Systems, (2)1:91-104, Mar. 1977.

Lorie, RA, *Shadow Page Mechanism*, IBM Technical Disclosure Bulletin, Jun. 1986, pp. 340-342.

McKusick, Marshall Kirk, et al., *A Fast File System for UNIX*, Computer Science Division, Department of Electrical Engineering and Computer Sciences, Univ. of CA, Berkley, Feb. 18, 1994.

Miller, Ethan L., et al., *RAMA:A File System for Massively Parallel Computers*, 12$^{th}$ IEEE Symposium on Mass Storage Systems, Monterey CA, Apr. 1993, pp. 163-168.

Moons, Herman et al., *Location-Independent Object Invocation in Open Distributed Systems*, Autumn 1991 EurOpen Technical Conference and Exhibition, pp. 287-300 (Sep. 16-20, 1991).

Morris, James H., et al, *Andrew: A Distributed Personal Computing Environment*, Comm. of the ACM, vol. 29, Mar. 1986, pp. 184-201.

Mullender, Sape J., et al., *A distributed file service based on optimistic concurrency control*, ACM Symposium on Operating System Principles (Orcas Island, Washington). Published as Operating Systems Review, 19(5):51-62, Dec. 1985.

Muller, Keith, et al., *A High Performance Multi-Structured File System Design*, In Proceedings of the 13th ACM Symposium on Operating Systems Principles, Oct. 1991, pp. 56-67.

Moons, Herman et al., *Location-Independent Object Invocation in Open Distributed Systems*, Autumn 1991 EurOpen Technical Conference and Exhibition, pp. 287-300 (Sep. 16-20, 1991).

Morris, James H., et al, *Andrew: A Distributed Personal Computing Environment*, Comm. of the ACM, vol. 29, Mar. 1986, pp. 184-201.

Mullender, Sape J., et al., *A distributed file service based on optimistic concurrency control*, ACM Symposium on Operating System Principles (Orcas Island, Washington). Published as Operating Systems Review, 19(5):51-62, Dec. 1985.

Muller, Keith, et al., *A High Performance Multi-Structured File System Design*, In Proceedings of the 13th ACM Symposium on Operating Systems Principles, Oct. 1991, pp. 56-67.

Ousterhout, John K. et al., *The Sprite Network Operating System*, Computer Science Division, Department of Electrical Engineering and Computer Sciences, Univ. of CA, Berkley, Nov. 19, 1987.

Ousterhout, John et al., *Beating the I/O Bottleneck: A Case for Log-Structured File Systems*, Technical Report, Computer Science Division, Electrical Engineering and Computer Sciences, University of California at Berkeley, Oct. 30, 1988.

Ousterhout, John, *Why Aren't Operating Systems Getting Faster as Fast as Hardware?*, Digital WRL Technical Note TN-11, Oct. 1989.

Ousterhout, John, *A Brief Retrospective on the Sprite Network Operating System*, found at http://www.cs.berkeley.edu/projects/sprite/retrospective.html,visited on Mar. 11, 2005.

Patterson, D., et al., *A Case for Redundant Arrays of Inexpensive Disks (RAID)*, Technical Report, CSD-87-391, Computer Science Division, Electrical Engineering and Computer Sciences, University of California at Berkeley (1987).

Patterson, D., et al., *A Case for Redundant Arrays of Inexpensive Disks (RAID)*, SIGMOD International Conference on Management of Data, Chicago, IL, USA, Jun. 1-3, 1988, SIGMOD Record (17)3:109-16 (Sep. 1988).

Peterson, Zachary Nathaniel Joseph, *Data Placement for Copy-on-Write Using Virtual Contiguity*, University of CA, Santa Cruz, Master of Science in Computer Science Thesis, Sep. 2002.

Quinlan, Sean, *A Cached WORM File System*, Software-Practice and Experience, 21(12):1289-1299 (1991).

Redundant Array of Independent Disks, from Wikipedia, the free encyclopedia, found at http://en.wikipedia.org/wiki/RAID, visited on Mar. 9, 2005.

Rosenberg, J., et al., *Stability in a Persistent Store Based on a Large Virtual Memory*, In Security and Persistence, Rosenber, J. & Keedy, J.L. (ed), Springer-Verlag (1990) pp. 229-245.

Rosenblum, Mendel, et al., *The LFS Storage Manager*, Computer Science Division, Electrical Engin. And Computer Sciences, Univ. of CA, presented at Summer '90 USENIX Technical Conference, Anaheim, CA Jun. 1990.

Rosenblum, Mendel, et al, The *Design and Implementation of a Log-Structured File System* Jul. 24, 1991 pp. 1-15.

Rosenblum, Mendel, et al., *The Design and Implementation of a Log-Structured File System*, , In Proceedings of ACM Transactions on Computer Systems, (10)1:26-52, Feb. 1992.

Sandberg, Russel et al., *Design and implementation of the Sun Network Filesystem*. In Proc. Summer 1985 USENIX Conf., pp. 119-130, Portland OR (USA), Jun. 1985.

Santry, Douglas S., et al., *Deciding When to Forget in the Elephant File System*, Operating Systems Review, 34(5), (Dec. 1999) pp. 110-123.

Satyanarayanan, M., et al., *The ITC Distributed File System: Principles and Design*, In Proceedings of the 10th ACM Symposium on Operating Systems Principles, (19)5:56-67, Dec. 1985.

Satyanarayanan,.M.. *A survey of distributed file-systems*. Annual Review of Computing Science, 4(73-104), 1989.

Satyanarayanan, M., et al, *Coda: A highly available file system for a distributed workstation environment*. IEEE Transactions on Computers, 39(4):447-459, 1990.

Satyanarayanan, Mahadev, *Scalable, Secure, and Highly Available Distributed File Access*, Computer May 1990: 9-21.

Sidebotham, Bob, *Volumes: The Andrew File System Data Structuring Primitive*, EEUG Conference Proceedings, Manchester, UK, Autumn 1986.

User Guide found at http://www.openafs.org/pages/doc/UserGuide/auusg004.htm, visited on Mar. 2, 2005.

Welch, Brent B., et al., *Pseudo Devices: User-Level Extensions to the Sprite File System*, Computer Science Division, Department of Electrical Engineering and Computer Sciences, Univ. of CA, Berkley, Apr. 1988.

Welch, Brent B., et al., *Pseudo-File-Systems*, Computer Science Division, Department of Electrical Engineering and Computer Sciences, Univ. of CA, Berkley, Oct. 1989.

Wittle, Mark, et al, *LADDIS: The next generation in NFS file server benchmarking*, USENIX Association Conference Proceedings, Apr. 1993.

* cited by examiner

SYSTEM AND METHOD FOR LUN CLONING

CROSS-REFERENCE TO RELATED APPLICATION

The present invention is related to the following U.S. patent application Ser. No. 10/412,478 titled, Writable Read-Only Snaphots, by Vijayan Rajan and filed on Apr. 11, 2003.

FIELD OF THE INVENTION

The present invention relates to storage systems and, more specifically, to a technique that conserves storage resources of a storage system.

BACKGROUND OF THE INVENTION

A storage system is a computer that provides storage service relating to the organization of information on writable persistent storage devices, such as memories, tapes or disks. The storage system is commonly deployed within a network attached storage (NAS) or storage area network (SAN) environment. A SAN is a high-speed network that enables establishment of direct connections between a storage system, such as an application server, and its storage devices. The SAN may thus be viewed as an extension to a storage bus and, as such, an operating system of the storage system enables access to stored information using block-based access protocols over the "extended bus". In this context, the extended bus is typically embodied as Fibre Channel (FC) or Ethernet media (i.e., network) adapted to operate with block access protocols, such as Small Computer Systems Interface (SCSI) protocol encapsulation over FC or Transmission Control Protocol/Internet Protocol (TCP/IP)/Ethernet.

SCSI is a peripheral input/output (I/O) interface with a standard, device independent protocol that allows different peripheral storage devices, such as disks, to attach to the storage system. In SCSI terminology, clients operating in a SAN environment are initiators that initiate requests and commands for data. The storage system is a target configured to respond to the requests issued by the initiators in accordance with a request/response protocol. The SAN clients typically identify and address the stored information in terms of blocks situated within target disks, or logical units thereof (also referred to within the industry as logical unit numbers or luns).

When used within a NAS environment, the storage system may be embodied as a file server including an operating system that implements a file system to logically organize the information as a hierarchical structure of directories and files on, e.g., the disks. Each "on-disk" file may be implemented as a set of data structures, e.g., disk blocks, configured to store information, such as the actual data for the file. The data blocks are typically organized within a volume block number (vbn) space that is maintained by the file system. The file system may also assign each data block in the file a corresponding "file offset" or file block number (fbn). The file system typically assigns sequences of fbns on a per-file basis, whereas vbns are assigned over a larger volume address space. The file system organizes the data blocks within the vbn space as a "logical volume"; each logical volume may be, although is not necessarily, associated with its own file system. A directory, on the other hand, may be implemented as a specially formatted file in which information about other files and directories are stored.

The file server, or filer, of a NAS system may be further configured to operate according to a client/server model of information delivery to thereby allow many client systems (clients) to access shared resources, such as files, stored on the filer. In the client/server model, the client may comprise an application executing on a computer that "connects" to the filer over a computer network, such as a point-to-point link, shared local area network, wide area network or virtual private network implemented over a public network, such as the Internet. The clients typically communicate with the filer by exchanging discrete frames or packets of data according to pre-defined protocols, such as the TCP/IP. NAS systems generally utilize file-based access protocols; therefore, each client may request the services of the filer by issuing file system protocol messages (in the form of packets) to the file system over the network.

A common type of file system is a "write in-place" file system, an example of which is the conventional Berkeley fast file system. In a write in-place file system, the locations of the data structures, such as index nodes (inodes) and data blocks, on disk are typically fixed. An inode is a data structure used to store information, such as metadata, about a file, whereas the data blocks are structures used to store the actual data for the file. The information contained in an inode may include, e.g., ownership of the file, access permission for the file, size of the file, file type and references to locations on disk of the data blocks for the file. The references to the locations of the file data are provided by pointers, which may further reference indirect blocks that, in turn, reference the data blocks, depending upon the quantity of data in the file. Changes to the inodes and data blocks are made "in-place" in accordance with the write in-place file system. If an update to a file extends the quantity of data for the file, an additional data block is allocated and the appropriate inode is updated to reference that data block.

Another type of file system is a write-anywhere file system that does not overwrite data on disks. If a data block on disk is retrieved (read) from disk into memory and "dirtied" with new data, the data block is stored (written) to a new location on disk to thereby optimize write performance. An example of a write-anywhere file system that is configured to operate on a filer is the Write Anywhere File Layout (WAFL™) file system available from Network Appliance, Inc. of Sunnyvale, Calif. The WAFL file system is implemented within a microkernel as part of the overall protocol stack of the filer and associated disk storage. This microkernel is supplied as part of Network Appliance's Data ONTAP™ storage operating system residing on the filer.

The WAFL file system has the capability to generate a snapshot of its active file system. An "active file system" is a file system to which data can be both written and read, or, more generally, an active store that responds to both read and write I/O operations. Further, it should be noted that "snapshot" is a trademark of Network Appliance, Inc. and is used for purposes of this patent to designate a persistent consistency point (CP) image. A persistent consistency point image (PCPI) is a space conservative, point-in-time read-only image of data accessible by name that provides a consistent image of that data at some previous time. More particularly, a PCPI is a point-in-time representation of a storage element, such as an active file system, file or database, stored on a storage device (e.g., on disk) or other persistent memory and having a name or other identifier that distinguishes it from other PCPIs taken at other points in time. A PCPI can also include other information (metadata) about the storage element at the particular point in time for which the image is taken. The terms "PCPI" and "snapshot" may be used interchangeably through out this patent without derogation of Network Appliance's trademark rights.

A file system, such as the WAFL file system, supports multiple snapshots that are generally created on a regular schedule. Each snapshot is a restorable version of the storage element (e.g., the active file system) created at a predetermined point in time and, as noted, is "read-only" accessible and "space-conservative". Space conservative denotes that common parts of the storage element in multiple snaphots share the same file system blocks. Only the differences among these various snapshots require extra storage blocks. The multiple snapshots of a storage element are not independent copies, each consuming disk space; therefore, creation of a snapshot on the WAFL file system is instantaneous, since no entity data needs to be copied. Read-only accessibility denotes that a snapshot cannot be modified because it is closely coupled to a single writable image in the active file system. The closely coupled association between a file in the active file system and the same file in a snapshot obviates the use of multiple "same" files. In the example of a WAFL based file system, snapshots are described in TR3002 *File System Design for a NFS File Server Appliance* by David Hitz et al., published by Network Appliance, Inc. and in U.S. Pat. No. 5,819,292 entitled Method for Maintaining Consistent States of a File System and For Creating User-Accessible Read-Only Copies of a File System, by David Hitz et al., each of which is hereby incorporated by reference as though full set forth herein.

Broadly stated, a snapshot is stored on-disk along with the active file system, and is called into a memory of a filer as requested by an operating system. The on-disk organization of the snapshot and the active file system can be understood from the following description of an exemplary file system inode structure 100 shown in FIG. 1. The inode for an inode file 105 contains information describing the inode file associated with the active file system. In this exemplary file system inode structure, the inode for the inode file 105 contains a pointer that references (points to) an inode file indirect block 110. The inode file indirect block 110 contains a set of pointers that reference inodes 117 which, in turn, contain pointers to indirect blocks 119. The indirect blocks 119 include pointers to file data blocks 120A, 120B and 120C. Each of the file data blocks 120(A-C) is capable of storing, e.g., 4 kilobytes (kB) of data. When the file system generates a snapshot of its active file system, a snapshot inode is generated as shown in FIG. 2. The snapshot inode 205 is, in essence, a duplicate copy of the inode for the inode file 105 of the file system 100 that shares common parts, such as inodes and blocks, with the active file system. For example, the exemplary file system structure 200 includes the inode file indirect blocks 110, inodes 117, indirect blocks 119 and file data blocks 120A-C as in FIG. 1

When a user modifies a file data block, the file system writes the new data block to disk and changes the active file system to point to the newly created block. FIG. 3 shows an exemplary inode file system structure 300 after a file data block has been modified. In this example, file data block 120C is modified to file data block 120C'. As a result, the contents of the modified file data block are written to a new location on disk as a function of the exemplary file system. Because of this new location, the indirect block 319 must be rewritten. Due to this changed indirect block 319, the inode 317 must be rewritten. Similarly, the inode file indirect block 310 and the inode for the inode file 305 must be rewritten.

Thus, after a file data block has been modified the snapshot inode 205 contains a pointer to the original inode file indirect block 110 which, in turn, contains pointers through the inode 117 and indirect block 119 to the original file data blocks 120A, 120B and 120C. The newly written indirect block 319 also includes pointers to unmodified file data blocks 120A and 120B. That is, the unmodified data blocks in the file of the active file system are shared with corresponding data blocks in the snapshot file, with only those blocks that have been modified in the active file system being different than those of the snapshot file.

However, the indirect block 319 further contains a pointer to the modified file data block 120C' representing the new arrangement of the active file system. A new inode for the inode file 305 is established representing the new structure 300. Note that metadata (not shown) stored in any of the snapshotted blocks (e.g., 205, 110, and 120C) protects these blocks from being recycled or overwritten until they are released from all snapshots. Thus, while the active file system inode for the inode file 305 points to new blocks 310, 317, 319, 120A, 120B and 120C', the old blocks 205, 110 and 120C are retained until the snapshot is fully released.

Snapshots provide a versatile feature that is essential for data recovery operations, such as backup and recovery of storage elements. However, since snapshots are read-only accessible and their contents cannot be modified, their use may be somewhat limited, particularly for operating systems and applications that do not have a notion of a read-only data store (a read-only file system) and that expect to write metadata at any time that the file system is accessible. This limitation may be overcome by using writable read-only snapshot technique as described in U.S. patent application Ser. No. 10/412,478 entitled Writable Read Only Snapshots, by Vijayan Rajan. A writable, read-only snapshot comprises a read-only "image" (file) residing in a snapshot and a writable virtual disk (vdisk) residing in the active file system. The writable vdisk is a "shadow" image of the snapshot file and, as such, includes an attribute that specifies the snapshot file to be used as a backing store. According to the technique, a write operation directed to the writable read-only snapshot is "trapped" such that the data associated with the operation is stored on the shadow, vdisk image in the active file system. In other words rather than directly accessing the read-only snapshot image of a lun, a client accesses the writable vdisk image, which provides a translucent view of the underlying read-only snapshot image. The writable vdisk is a sparse file containing only that data written by the client (e.g., an initiator in a SAN) to the read-only snapshot image subsequent to a snapshot operation to a volume underlying the lun (vdisk).

To the client, the data retrieved from the writable, read-only snapshot is always the latest data written. The client "sees" the writable vdisk data first (if it exists) and is served that data, the underlying read-only snapshot image being inaccessible for the range of valid data in the writable vdisk. Read-only data from the underlying snapshot image is delivered to the client when no valid data overlying the range exists in the writable vdisk. The underlying snapshot image is accessible and recoverable via a non-translucent path of directly accessing the snapshot image. By this technique, data integrity of a snapshotted lun or vdisk (as an inviolate backup) is preserved.

The writable read only snapshot technique allows many writable vdisks to be "tied" to a single backing store snapshot file. This backing store file may be quite large consuming substantial storage (disk) space. After a period of time, it may be desirable to delete the backing store and free the disk space it consumes. Yet the backing store may not be deleted as long as it is referenced by at least one writable vdisk, even if that vdisk has totally diverged from the backing store. That is, if the backing store is referenced by a writable vdisk, it cannot be deleted even if every data block in the vdisk has been modified from its original state in the backing store.

Previous solutions to this problem have required taking the writable vdisk offline while the backing store is being released. This is undesirable since it creates downtime visible to client applications served by the filer or storage system and substantially decreases system performance. Other proposed solutions have involved restoring the backing store to the active file system using a technique such as single file snap restore (SFSR) described in U.S. patent application Ser. No. 10/100,948 entitled System and Method for Restoring a Single File from a Snapshot. Yet this is not a desirable solution because the restored snapshot does not contain the contents of modified data blocks, such as modified data block 120C', and rather reflects an older version of the of data blocks, such as old version 120C. Further any technique involving SFSR would generally render the snapshot inaccessible for the duration of the restore operation.

What is needed is a "zero-downtime" technique to delete a snapshot and free its consumed disk space.

SUMMARY OF THE INVENTION

The present invention overcomes the disadvantages of the prior art by providing a novel logical unit number (LUN) cloning technique that "separates" data blocks referenced by a writable virtual disk (vdisk) from data blocks referenced only by a backing store. LUN cloning, in this context, denotes separating the data blocks to create an independent vdisk from the writable vdisk. This, in turn, allows the backing store data blocks to be deallocated, to thereby conserve storage resources of a storage system, such as a multi-protocol storage appliance. Notably, separation of the writable vdisk data blocks is from the backing store occurs without interrupting service of data access requests and preferably occurs during periods of reduced processing activity.

In the illustrative embodiment, a file system invokes a "backdoor" message handler that loads blocks of the writable vdisk, and its backing store file, from disk into a buffer cache of the storage appliance. The loaded blocks are represented as vdisk and backing store buffer trees that include, among other structures, indirect blocks. A special vdisk loading function of the file system "walks through" all the indirect blocks of the writable vdisk, searching for invalid values of volume block number (VBN) pointers. While a valid VBN pointer (e.g., a non-zero value) directly references a data block, an invalid VBN pointer represents a "hole." A hole instructs the file system to examine the value of the VBN pointer in a corresponding indirect block of the backing store.

If the VBN pointer of the backing store has a non-zero value, the backdoor message handler loads the "old" data block referenced by the VBN pointer into the buffer cache and marks that block as "dirty," without changing its data contents. A write allocator of the file system thereafter "write allocates" the dirty block by, e.g., choosing a new VBN for a newly allocated block, setting appropriate bits in block allocation structures, placing the chosen VBN into the appropriate indirect block of the writable vdisk, and deleting (freeing) the old data block prior to storing (writing) the new block to disk. This process is repeated for all instances of holes discovered in the indirect blocks of the writable vdisk.

The file system then "releases" an association of the writable vdisk to the backing store by, e.g., deleting a backing store file handle reference from an attributes inode of the writable vdisk. In addition, the file system updates an appropriate entry of a vdisk table of contents (VTOC) structure to remove the backing store file handle reference.

Advantageously, the inventive technique uses backdoor messaging to separate the writable vdisk data blocks from the backing store, thereby obviating the need to take the writable vdisk data blocks offline. Thus the LUN cloning technique results in zero-downtime for the multi-protocol storage appliance and is transparent to client applications served by the storage appliance.

BRIEF DESCRIPTION OF THE DRAWINGS

The above and further advantages of the invention may be better understood by referring to the following description in conjunction with the accompanying drawings in which like reference numerals indicate identical or functionally similar elements.

DETAILED DESCRIPTION OF AN ILLUSTRATIVE EMBODIMENT

Figure 1:
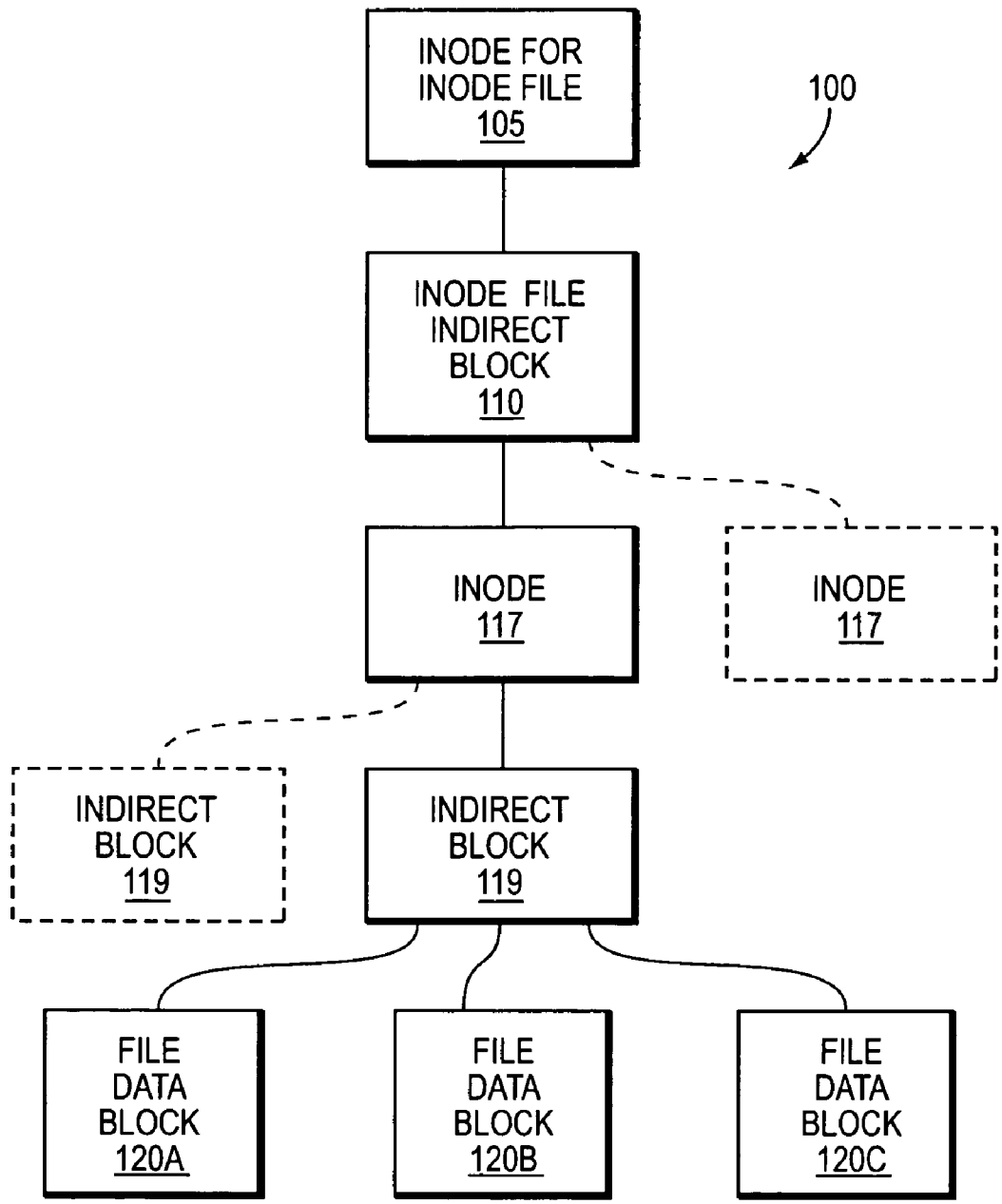
FIG. 1 is a schematic block diagram of an exemplary file system inode structure.
Figure 2:
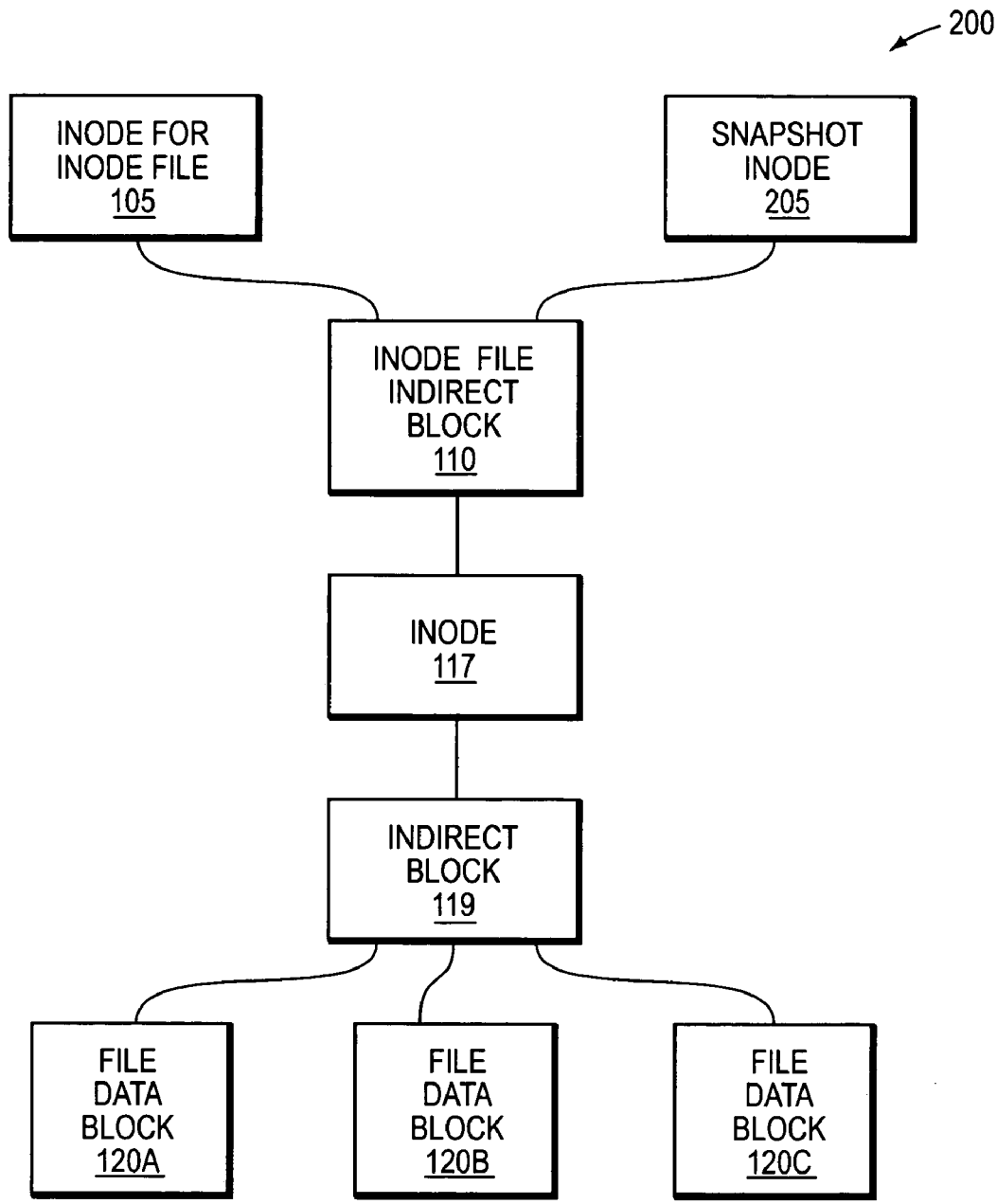
FIG. 2 is a schematic block diagram of the exemplary file system inode structure of FIG. 1 including a snapshot inode.
Figure 3:
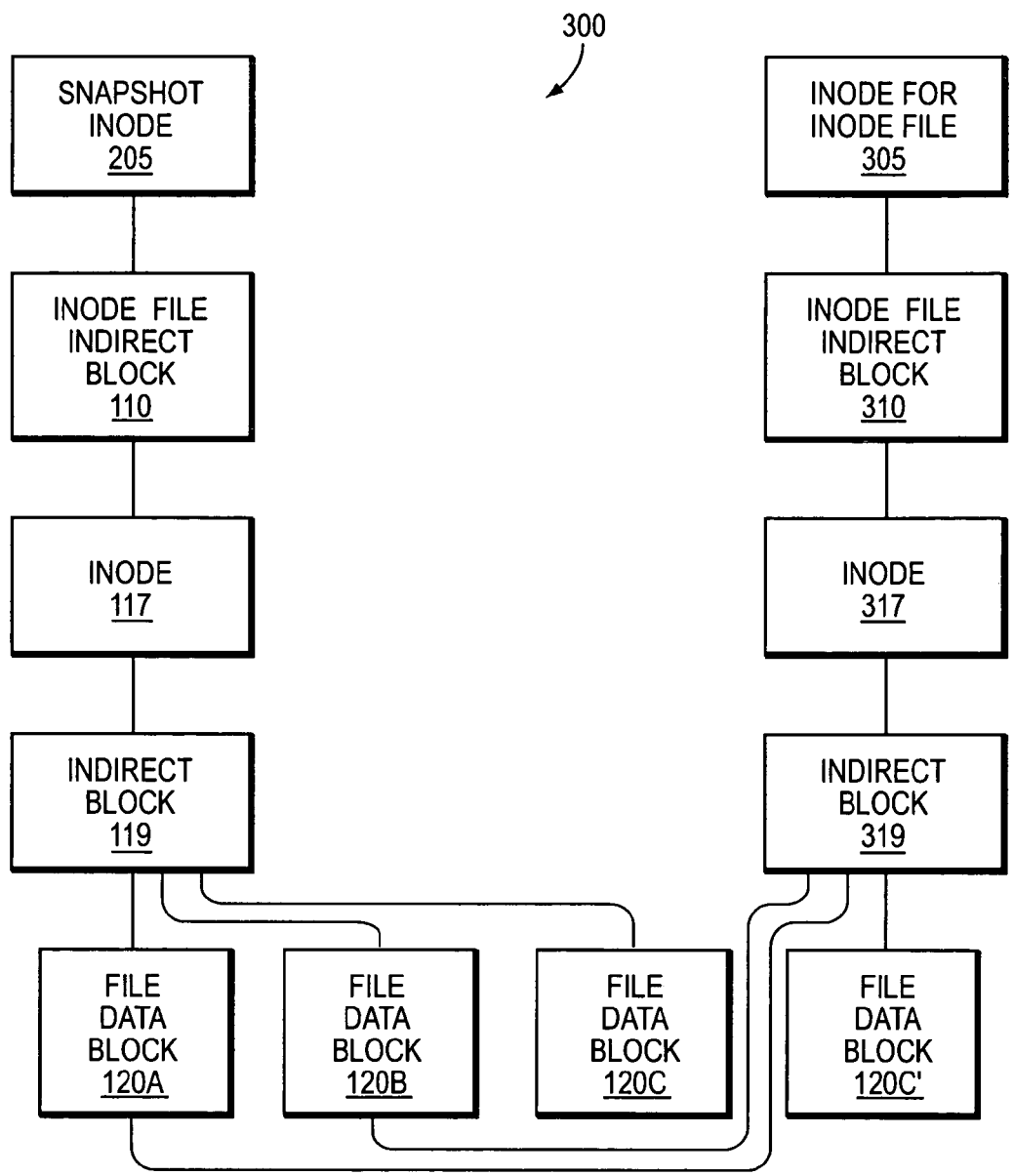
FIG. 3 is a schematic block diagram of an exemplary file system inode structure of FIG. 2 after a data block has been rewritten.
Figure 4:
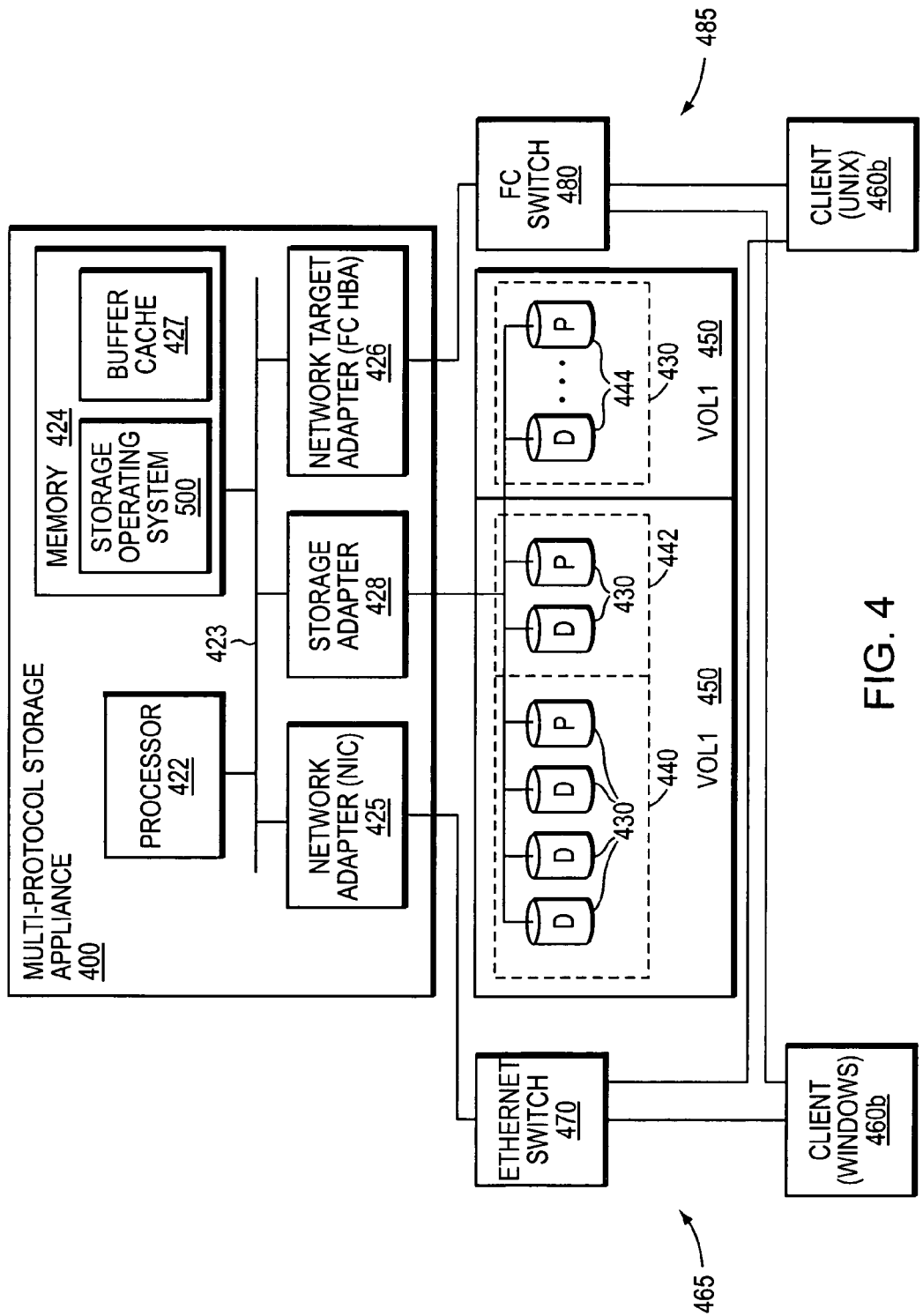
FIG. 4 is a schematic block diagram of a multi-protocol storage appliance that may be advantageously used with the present invention.

FIG. 4 is a schematic block diagram of a multi-protocol storage appliance 400 that may be advantageously used with the present invention. The multi-protocol storage appliance is configured to provide storage service for both file and block protocol access to information stored on storage devices in an integrated manner. In this context, the integrated multi-protocol appliance denotes a computer having features such as simplicity of storage service management and ease of storage reconfiguration, including reusable storage space, for users (system administrators) and clients of network attached storage (NAS) and storage area network (SAN) deployments.

The multi-protocol storage appliance 400 is illustratively embodied as a storage system comprising a processor 422, a memory 424, a plurality of network adapters 425, 426 and a storage adapter 428 interconnected by a system bus 423. The multi-protocol storage appliance 400 also includes a storage operating system 500 that provides a virtualization system (and, in particular, a file system) to logically organize the information as a hierarchical structure of named directory, file and virtual disk (vdisk) storage objects on the disks 430. An example of a multi-protocol storage appliance that may be advantageously used with the present invention is described in co-pending and commonly assigned U.S. patent application Ser. No. 10/215,917 titled A Multi-Protocol Storage Appliance that Provides Integrated Support for File and Block Access Protocols, by Brian Pawlowski, et al.

Whereas clients of a NAS-based network environment have a storage viewpoint of files within volumes, the clients of a SAN-based network environment have a storage viewpoint of blocks within disks. To that end, the multi-protocol storage appliance 400 presents (exports) disks to SAN clients through the creation of logical unit numbers (luns) or vdisk objects. A vdisk object (hereinafter "vdisk") is a special file type that is implemented by the virtualization system and translated into an emulated disk as viewed by the SAN clients. The multi-protocol storage appliance thereafter makes these emulated disks accessible to the SAN clients through controlled exports.

In the illustrative embodiment, the memory 424 comprises storage locations that are addressable by the processor and adapters for storing software program code. A portion of the memory may be further organized as a "buffer cache" 427 for storing data structures associated with the present invention. The processor and adapters may, in turn, comprise processing elements and/or logic circuitry configured to execute the software code and manipulate the data structures. The storage operating system 500, portions of which are typically resident in memory and executed by the processing elements, functionally organizes the storage appliance by, inter alia, invoking storage operations in support of the storage service implemented by the appliance. It will be apparent to those skilled in the art that other processing and memory means, including various computer readable media, may be used for storing and executing program instructions pertaining to the invention described herein.

The network adapter 425 couples the storage appliance to a plurality of clients 460*a,b* over point-to-point links, wide area networks, virtual private networks implemented over a public network (Internet) or a shared local area network, hereinafter referred to as an illustrative Ethernet network 465. For this NAS-based network environment, the clients are configured to access information stored on the multi-protocol appliance as files. Therefore, the network adapter 425 may comprise a network interface card (NIC) having the mechanical, electrical and signaling circuitry needed to connect the appliance to a network switch, such as a conventional Ethernet switch 470. The clients 460 communicate with the storage appliance over network 465 by exchanging discrete frames or packets of data according to pre-defined protocols, such as the Transmission Control Protocol/Internet Protocol (TCP/IP).

The clients 460 may be general-purpose computers configured to execute applications over a variety of operating systems, including the UNIX® and Microsoft® Windows™ operating systems. Client systems generally utilize file-based access protocols when accessing information (in the form of files and directories) over a NAS-based network. Therefore, each client 460 may request the services of the storage appliance 400 by issuing file access protocol messages (in the form of packets) to the appliance over the network 465. For example, a client 460*a* running the Windows operating system may communicate with the storage appliance 400 using the Common Internet File System (CIFS) protocol over TCP/IP. On the other hand, a client 460*b* running the UNIX operating system may communicate with the multi-protocol appliance using either the Network File System (NFS) protocol over TCP/IP or the Direct Access File System (DAFS) protocol over a virtual interface (VI) transport in accordance with a remote DMA (RDMA) protocol over TCP/IP. It will be apparent to those skilled in the art that other clients running other types of operating systems may also communicate with the integrated multi-protocol storage appliance using other file access protocols.

The storage network "target" adapter 426 also couples the multi-protocol storage appliance 400 to clients 460 that may be further configured to access the stored information as blocks or disks. For this SAN-based network environment, the storage appliance is coupled to an illustrative Fibre Channel (FC) network 485. FC is a networking standard describing a suite of protocols and media that is primarily found in SAN deployments. The network target adapter 426 may comprise a FC host bus adapter (HBA) having the mechanical, electrical and signaling circuitry needed to connect the appliance 400 to a SAN network switch, such as a conventional FC switch 480. In addition to providing FC access, the FC HBA may offload fiber channel network processing operations for the storage appliance.

The clients 460 generally utilize block-based access protocols, such as the Small Computer Systems Interface (SCSI) protocol, when accessing information (in the form of blocks, disks or vdisks) over a SAN-based network. SCSI is a peripheral input/output (I/O) interface with a standard, device independent protocol that allows different peripheral devices, such as disks 430, to attach to the storage appliance 400. In SCSI terminology, clients 460 operating in a SAN environment are initiators that initiate requests and commands for data. The multi-protocol storage appliance is thus a target configured to respond to the requests issued by the initiators in accordance with a request/response protocol. The initiators and targets have endpoint addresses that, in accordance with the FC protocol, comprise worldwide names (WWN). A WWN is a unique identifier, e.g., a node name or a port name, consisting of an 8-byte number.

The multi-protocol storage appliance 400 supports various SCSI-based protocols used in SAN deployments, including SCSI encapsulated over TCP (iSCSI) and SCSI encapsulated over FC (FCP). The initiators (hereinafter clients 460) may thus request the services of the target (hereinafter storage appliance 400) by issuing iSCSI and FCP messages over the network 485 to access information stored on the disks. It will be apparent to those skilled in the art that the clients may also request the services of the integrated multi-protocol storage appliance using other block access protocols. By supporting a plurality of block access protocols, the multi-protocol storage appliance provides a unified and coherent access solution to vdisks/luns in a heterogeneous SAN environment.

The storage adapter 428 cooperates with the storage operating system 500 executing on the storage appliance to access information requested by the clients. The information may be stored on the disks 430 or other similar media adapted to store information. The storage adapter includes I/O interface circuitry that couples to the disks over an I/O interconnect arrangement, such as a conventional high-performance, FC serial link topology. The information is retrieved by the storage adapter and, if necessary, processed by the processor 422 (or the adapter 428 itself) prior to being forwarded over the system bus 423 to the network adapters 425, 426, where the information is formatted into packets or messages and returned to the clients.

Storage of information on the appliance 400 is preferably implemented as one or more storage volumes (e.g., VOL1-2 450) that comprise a cluster of physical storage disks 430, defining an overall logical arrangement of disk space. Each volume may be associated with its own file system and, for purposes herein, volume and file system may be used synonymously. The disks within a volume are typically organized as one or more groups of Redundant Array of Independent (or Inexpensive) Disks (RAID). RAID implementations enhance the reliability/integrity of data storage through the writing of data "stripes" across a given number of physical disks in the RAID group, and the appropriate storing of redundant information with respect to the striped data. The redundant information enables recovery of data lost when a storage device fails.

Specifically, each volume 450 is constructed from an array of physical disks 430 that are organized as RAID groups 440, 442, and 444. The physical disks of each RAID group include those disks configured to store striped data (D) and those configured to store parity (P) for the data, in accordance with an illustrative RAID 4 level configuration.

However, other RAID level configurations (e.g. RAID 5) are also contemplated. In the illustrative embodiment, a minimum of one parity disk and one data disk may be employed. Yet, a typical implementation may include three data and one parity disk per RAID group and at least one RAID group per volume.

To facilitate access to the disks 430, the storage operating system 500 implements a write-anywhere file system that cooperates with virtualization modules to provide a function that "virtualizes" the storage space provided by disks 430. The file system logically organizes the information as a hierarchical structure of named directory and file objects (hereinafter "directories" and "files") on the disks. Each "on-disk" file may be implemented as set of disk blocks configured to store information, such as data, whereas the directory may be implemented as a specially formatted file in which names and links to other files and directories are stored. The virtualization modules allow the file system to further logically organize information as a hierarchical structure of named vdisks on the disks, thereby providing an integrated NAS and SAN appliance approach to storage by enabling file-based (NAS) access to the files and directories, while further enabling block-based (SAN) access to the vdisks on a file-based storage platform.

In the illustrative embodiment, the storage operating system is preferably the NetApp® Data ONTAP™ operating system available from Network Appliance, Inc., Sunnyvale, Calif. that implements a Write Anywhere File Layout (WAFL™) file system. However, it is expressly contemplated that any appropriate storage operating system, including a write in-place file system, may be enhanced for use in accordance with the inventive principles described herein. As such, where the term "WAFL" is employed, it should be taken broadly to refer to any storage operating system that is otherwise adaptable to the teachings of this invention.

As used herein, the term "storage operating system" generally refers to the computer-executable code operable on a computer that manages data access and may, in the case of a multi-protocol storage appliance, implement data access semantics, such as the Data ONTAP storage operating system, which is implemented as a microkernel. The storage operating system can also be implemented as an application program operating over a general-purpose operating system, such as UNIX® or Windows NT®, or as a general-purpose operating system with configurable functionality, which is configured for storage applications as described herein.

In addition, it will be understood to those skilled in the art that the inventive technique described herein may apply to any type of special-purpose (e.g., storage serving appliance) or general-purpose computer, including a standalone computer or portion thereof, embodied as or including a storage system. Moreover, the teachings of this invention can be adapted to a variety of storage system architectures including, but not limited to, a network-attached storage environment, a storage area network and disk assembly directly-attached to a client or host computer. The term "storage system" should therefore be taken broadly to include such arrangements in addition to any subsystems configured to perform a storage function and associated with other equipment or systems.

Figure 5:
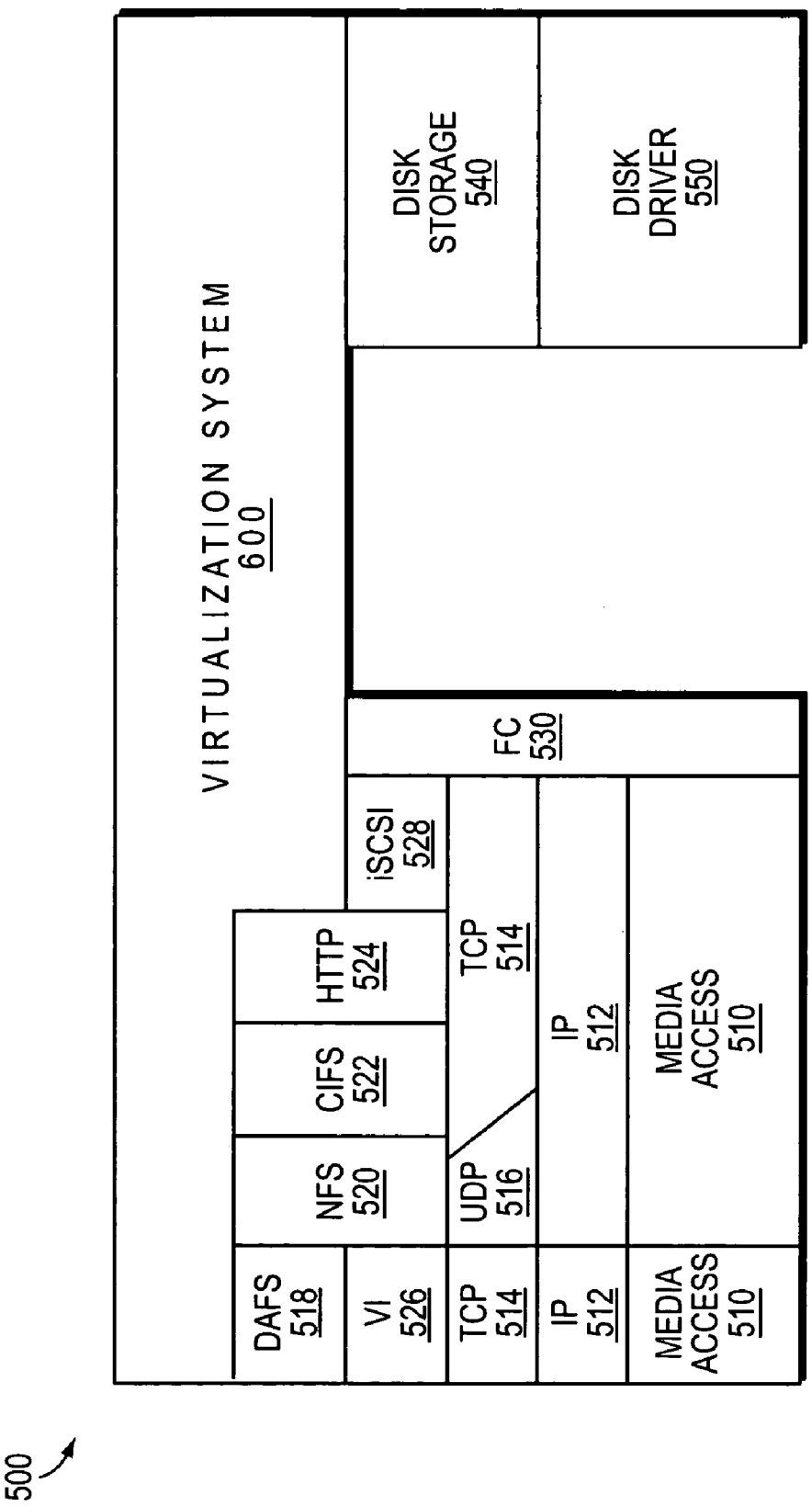
FIG. 5 is a schematic block diagram of a storage operating system of the multi-protocol storage appliance that may be advantageously used with the present invention.

FIG. 5 is a schematic block diagram of the storage operating system 500 that may be advantageously used with the present invention. The storage operating system comprises a series of software layers organized to form an integrated network protocol stack or, more generally, a multi-protocol engine that provides data paths for clients to access information stored on the multi-protocol storage appliance using block and file access is protocols. The protocol stack includes a media access layer 510 of network drivers (e.g., gigabit Ethernet drivers) that interfaces to network protocol layers, such as the IP layer 512 and its supporting transport mechanisms, the TCP layer 514 and the User Datagram Protocol (UDP) layer 516. A file system protocol layer provides multi-protocol file access and, to that end, includes support for the DAFS protocol 518, the NFS protocol 520, the CIFS protocol 522 and the Hypertext Transfer Protocol (HTTP) protocol 524. A VI layer 526 implements the VI architecture to provide direct access transport (DAT) capabilities, such as RDMA, as required by the DAFS protocol 518.

An iSCSI driver layer 528 provides block protocol access over the TCP/IP network protocol layers, while a FC driver layer 530 operates with the FC HBA 426 to receive and transmit block access requests and responses to and from the integrated storage appliance. The FC and iSCSI drivers provide FC-specific and iSCSI-specific access control to the luns (vdisks) and, thus, manage exports of vdisks to either iSCSI or FCP or, alternatively, to both iSCSI and FCP when accessing a single vdisk on the multi-protocol storage appliance. In addition, the storage operating system includes a disk storage layer 540 that implements a disk storage protocol, such as a RAID protocol, and a disk driver layer 550 that implements a disk access protocol such as, e.g., a SCSI protocol.

Figure 6:
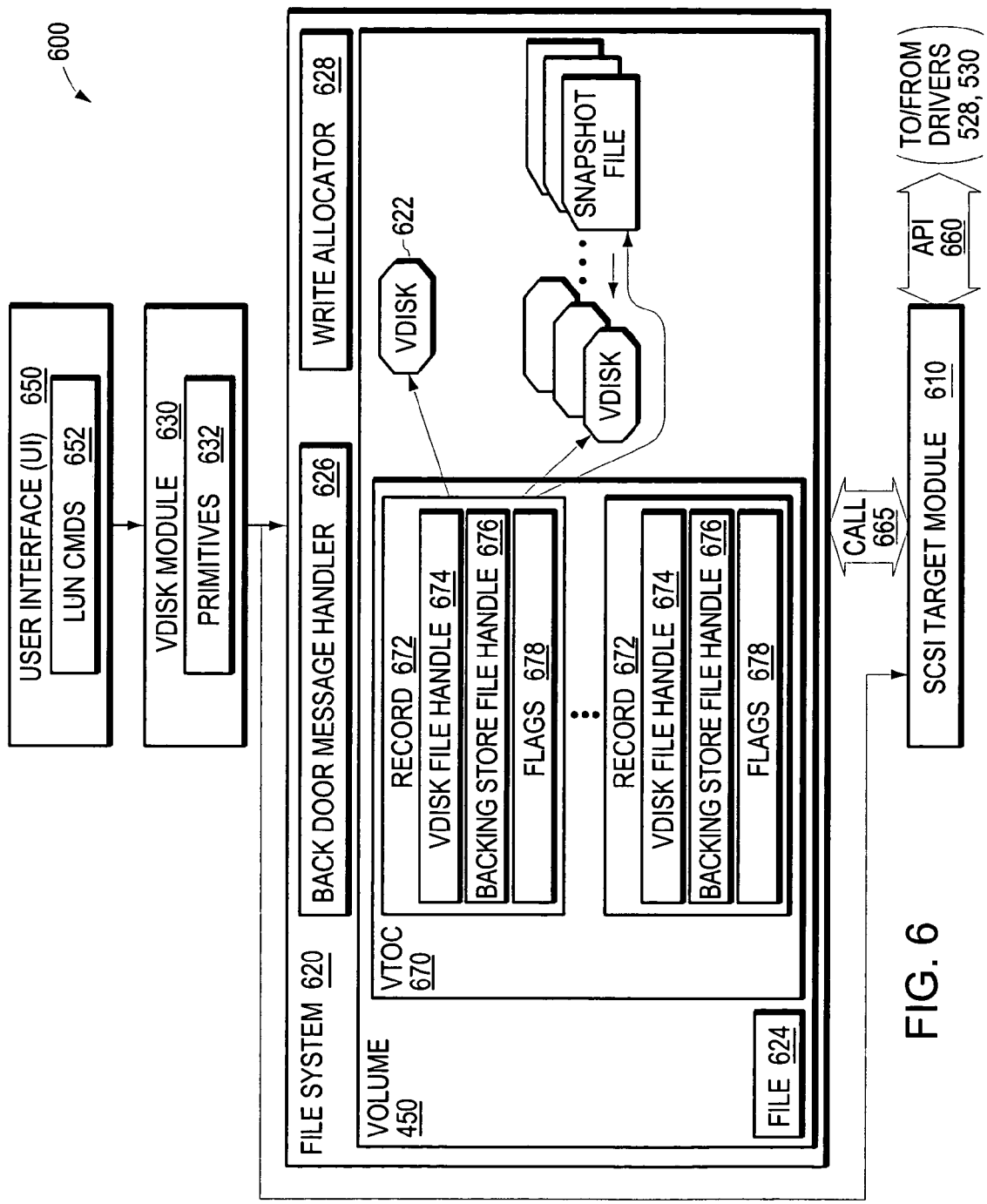
FIG. 6 is a schematic block diagram of a virtualization system that is implemented by a file system interacting with virtualization modules of the storage operating system.

Bridging the disk software layers with the integrated network protocol stack layers is a virtualization system 600. FIG. 6 is a schematic block diagram of the virtualization system 600 that is implemented by a file system 620 interacting with virtualization modules illustratively embodied as, e.g., vdisk module 630 and SCSI target module 610. It should be noted that the vdisk module 630, the file system 620 and SCSI target module 610 can be implemented in software, hardware, firmware, or a combination thereof. The vdisk module 630 is layered on the file system 620 to enable access by administrative interfaces, such as a streamlined user interface (UI 650), in response to a system administrator issuing commands to the multi-protocol storage appliance 400. In essence, the vdisk module 630 manages SAN deployments by, among other things, implementing a comprehensive set of vdisk (lun) commands (cmds) 652 issued through the UI 650 by a system administrator. These vdisk commands are converted to primitive file system operations ("primitives 632") that interact with the file system 620 and the SCSI target module 610 to implement the vdisks.

The SCSI target module 610, in turn, initiates emulation of a disk or lun by providing a mapping procedure that translates a lun identifier to a vdisk-type file. The SCSI target module is illustratively disposed between the FC and iSCSI drivers 528, 530 and the file system 620 to thereby provide a translation layer of the virtualization system 600 between the SAN block (lun) space and the file system space, where luns are represented as vdisks 622. To that end, the SCSI target module has a set of application programming interfaces (APIs 660) that are based on the SCSI protocol and that enable a consistent interface to both the iSCSI and FCP drivers 528, 530. By "disposing" SAN virtualization over the file system 620, the multi-protocol storage appliance reverses the approach taken by prior systems to thereby provide a single unified storage platform for essentially all storage access protocols.

The file system 620 is illustratively a message-based system; as such, the SCSI target module 610 transposes a SCSI request into a message representing an operation directed to the file system. For example, the message generated by the SCSI target module may include a type of operation (e.g., read, write) along with a pathname (e.g., a path descriptor) and a filename (e.g., a special filename) of the vdisk object represented in the file system. Alternatively, the generated message may include an operation type and file handle containing volume/inode information. The SCSI target module 610 passes the message into the file system layer 620 as, e.g., a function call 665, where the operation is performed.

The file system provides volume management capabilities for use in block-based access to the information stored on the storage devices, such as disks. That is, in addition to providing file system semantics, such as naming of storage objects, the file system 620 provides functions normally associated with a volume manager. These functions include (i) aggregation of the disks, (ii) aggregation of storage bandwidth of the disks, and (iii) reliability guarantees, such as mirroring and/or parity (RAID), to thereby present one or more storage objects layered on the file system. A feature of the multi-protocol storage appliance is the simplicity of use associated with these volume management capabilities, particularly when used in SAN deployments.

The file system 620 illustratively implements the WAFL file system having an on-disk format representation that is block-based using, e.g., 4 kilobyte (kB) blocks and using inodes to describe the files 624. The file system uses files to store metadata describing the layout of its file system; these metadata files include, among others, an inode file. A file handle, i.e., an identifier that includes an inode number, is used to retrieve an inode from disk. As noted, the WAFL file system also supports multiple snapshots that are generally created on a regular schedule. A description of the structure of the file system, including on-disk inodes, the inode file and snapshots, is provided in U.S. Pat. No. 5,819,292. Notably, snapshots are created on the multi-protocol storage appliance without the need for prior configuration of the underlying storage. This feature of the appliance simplifies the creation and management of data recovery techniques for business continuance compared to previous block-based recovery methods and mechanisms.

Figure 7:
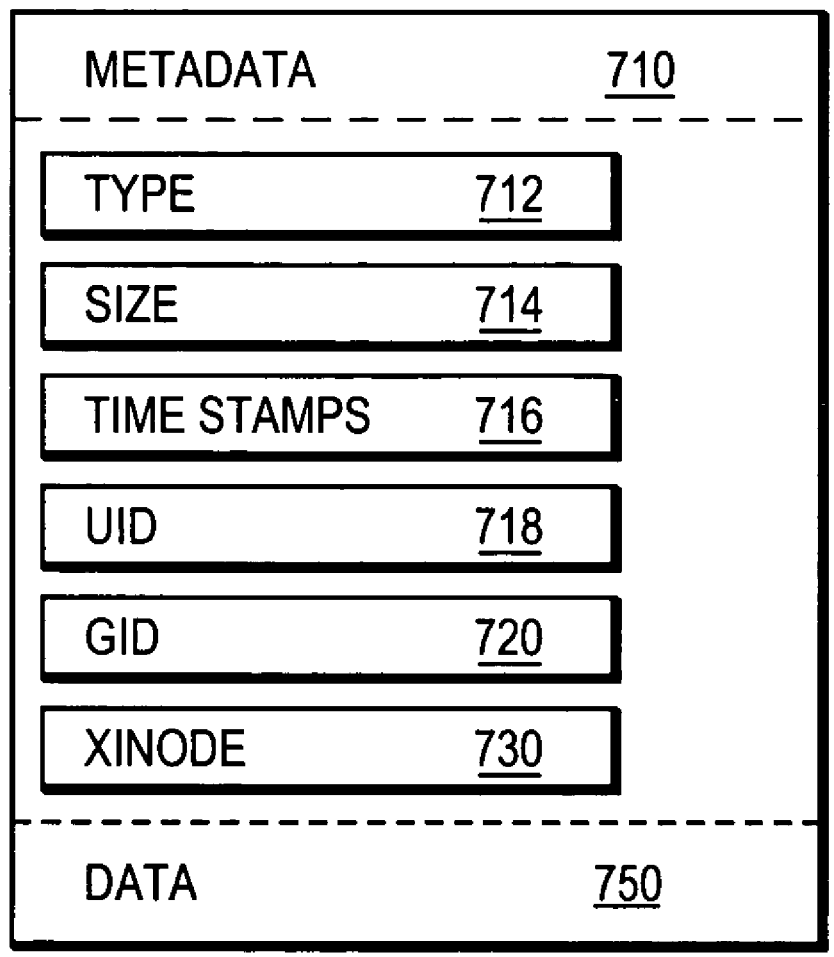
FIG. 7 is a schematic block diagram of an on-disk inode data structure that may be advantageously used with the present invention.

FIG. 7 is a schematic block diagram illustrating an on-disk inode 700, which includes a metadata section 710 and a data section 750. The information stored in the metadata section 710 of each inode 700 describes the file and, as such, includes the type (e.g., regular, directory) 712 of file, the size 714 of the file, time stamps (e.g., access and/or modification) 716 for the file and ownership, i.e., user identifier (UID 718) and group ID (GID 720), of the file. The metadata section 710 further includes a xinode field 730 containing a pointer that references another on-disk inode structure containing, e.g., access control list (ACL) information associated with the file or directory. The contents of the data section 750 of each inode, however, may be interpreted differently depending upon the type of file (inode) defined within the type field 712. For example, the data section 750 of a directory inode contains metadata controlled by the file system, whereas the data section of a regular inode contains user-defined data. In this latter case, the data section 750 includes a representation of the data associated with the file.

Specifically, the data section 750 of a regular on-disk inode may include user data or pointers, the latter referencing 4 kB data blocks on disk used to store the user data. Each pointer is preferably a logical volume block number (VBN) to thereby facilitate efficiency among the file system and the disk storage (RAID) layer 540 when accessing the data on disks. Given the restricted size (128 bytes) of the inode, user data having a size that is less than or equal to 64 bytes is represented, in its entirety, within the data section of that inode. However, if the user data is greater than 64 bytes but less than or equal to 64 kB, then the data section of the inode comprises up to 16 pointers, each of which references a 4 kB block of data on the disk. Moreover, if the size of the data is greater than 64 kilobytes but less than or equal to 64 megabytes (MB), then each pointer in the data section 750 of the inode references an indirect block that contains 1024 pointers, each of which references a 4 kB data block on disk. Each data block is loaded from disk 430 into memory 424 in order to access the data. As noted, the size field 714 of the metadata section 710 of the inode refers to the size of the file.

Broadly stated, all inodes of the file system are organized into the inode file. A file system (FS) info block specifies the layout of information in the file system and includes an inode of a file that includes all other inodes of the file system. Each volume has an FS info block that is preferably stored at a fixed location within, e.g., a RAID group of the file system. The inode of the root FS info block may directly reference (point to) blocks of the inode file or may reference indirect blocks of the inode file that, in turn, reference direct blocks of the inode file. Within each direct block of the inode file are embedded inodes, each of which may reference indirect blocks that, in turn, reference data blocks of a file or vdisk.

As noted, a vdisk is a special file type in a volume that derives from a plain (regular) file, but that has associated export controls and operation restrictions that support emulation of a disk. Unlike a file that can be created by a client using, e.g., the NFS or CIFS protocol, a vdisk is created on the multi-protocol storage appliance via, e.g. a user interface (UI) as a special typed file (object). Illustratively, the vdisk is a multi-inode object comprising a special file inode that holds data and at least one associated stream inode that holds attributes. The special file inode functions as a main container for storing data, such as application data, associated with the emulated disk. The stream inode stores attributes that, among others, allow luns and exports to persist over, e.g., reboot operations, while also enabling management of the vdisk as a single disk object in relation to SAN clients.

Figure 8:
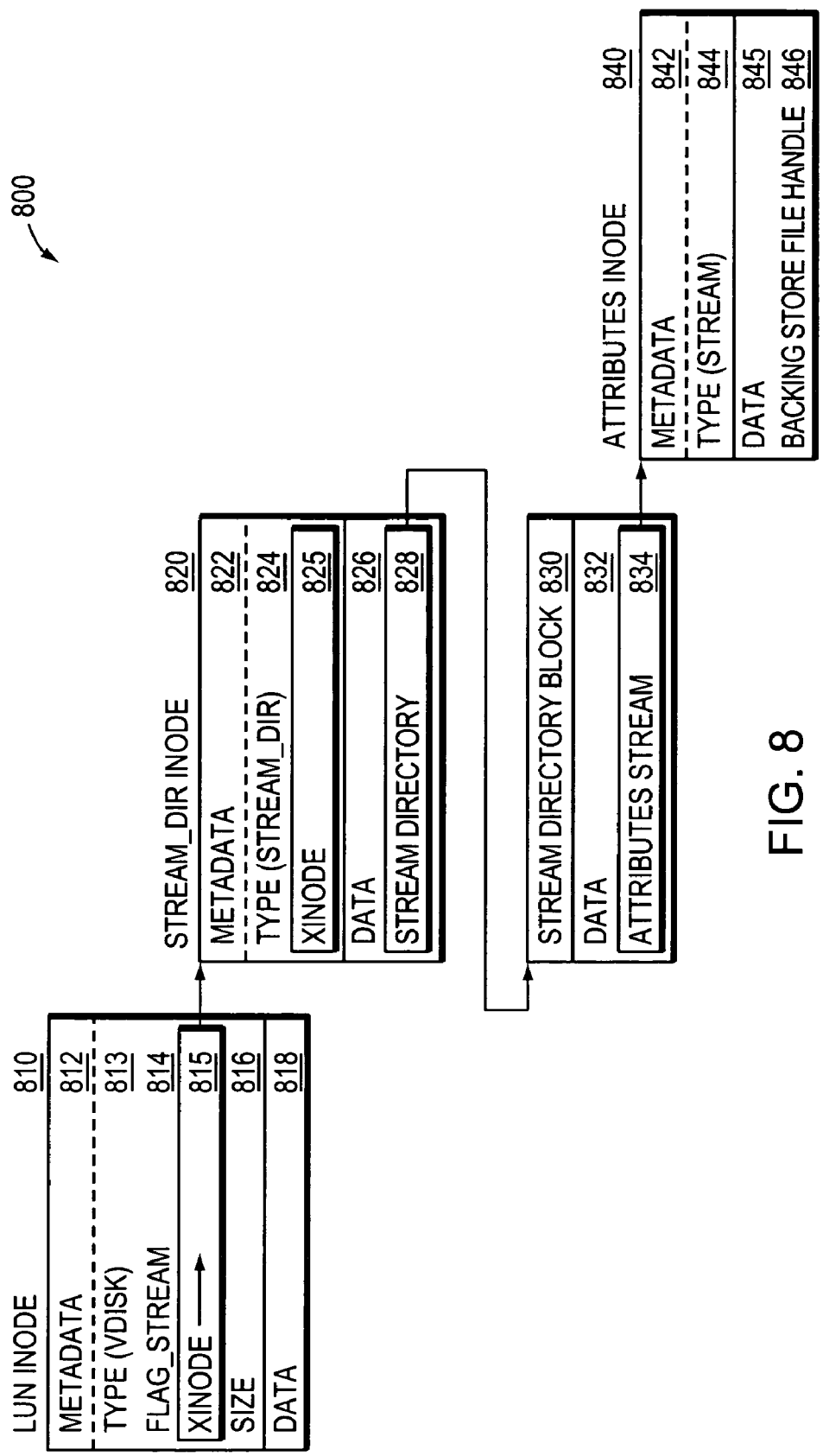
FIG. 8 is a schematic block diagram illustrating an on-disk representation of virtual disk (vdisk) inode data structures, including logical unit number (LUN) and attributes inodes, that may be advantageously used with the present invention.

FIG. 8 is a schematic block diagram illustrating an on-disk representation of vdisk inode data structures 800, including a lun inode 810 and an attributes inode 840. The lun inode 810 is the special file inode that functions as a main container for storing data associated with the vdisk 622. That is, the lun inode comprises a data section 818 that may store the actual (user or application) data or pointers referencing 4 kB data blocks on disk used to store the data, as described in FIG. 7. The data stored in this "default" container can be retrieved (read) and stored (written) by a client using conventional block access protocols, such as the SCSI protocol. When appropriately configured, a vdisk may also be accessed using conventional file-level access protocols, such as the NFS protocol. In this configuration, a vdisk "appears" to be a regular file for such accesses. The lun inode 810 also comprises a metadata section 812 containing metadata such as the type 813 (i.e., a special vdisk type) and size 816 of the vdisk that, upon creation of the inode, is zero. A flag stream flag 814 identifies the lun inode 810 as having not only a default data container section 818 but also one or more stream "sections", as provided by stream_dir inode 820.

In order to access the stream_dir inode 820, the pointer of xinode field 815 in lun inode 810 is modified to reference the inode 820. The stream_dir inode 820 comprises a metadata section 822 that includes a type (stream_dir) field 824 and an xinode field 825 that references another on-disk inode structure containing, e.g., access control (such as CIFS permission) information associated with the vdisk. The inode 820 also includes a data section 826 containing a pointer 828 that references a stream directory data block associated with the vdisk, such as stream directory block 830. The stream directory block 830 comprises a data section 832 that includes a plurality of entries, each containing an external representation of a stream inode along with mapping information (i.e., the inode number) for that inode. One of those entries, entry 834, contains mapping information (e.g., a pointer) that references an attributes (stream) inode 840.

The attributes inode 840 comprises a metadata section 842 that includes a type (stream) field 844 and a data section 845 that functions as a persistent store for holding various named attributes associated with the vdisk 622. Attributes are an implementation mechanism that is internal to the file system and not managed by users. An example of an attribute is a snapshot file handle 846 or file handle of a "backing store" file (i.e., the snapshot file). The backing store file handle 846 includes a snapshot identifier (ID), which is an identifier (pointer) to a snapshot containing the snapshot file, and a file ID, which is an identifier (pointer) to the snapshot file. As described herein, the snapshot file functions as a backing store for the vdisk when the vdisk is used as a writable, read-only snapshot. The vdisk and its associated inodes are further described in U.S. patent application Ser. No. 10/216,453 titled Storage Virtualization by Layering Vdisks on a File System, by Vijayan Rajan, et al.

While vdisks are self-contained objects containing all data necessary for proper operation and authorization, a vdisk table of contents (VTOC 670 in FIG. 6) is provided as a performance enhancement to finding and loading vdisks. The VTOC is not necessary for correct operation and can be reconstructed dynamically by a scan of the vdisks. The VTOC 670 is a per-volume data structure that is stored in a metadata file and that is used to optimize location determination (i.e. finding) and initialization of persistent vdisks 622 in a volume 450. In addition, the VTOC 670 facilitates resolution of the location of a file within a particular snapshot, i.e., allows efficient resolution of a snapshot file location.

The VTOC 670 comprises one or more records 672, wherein each record includes flags 678 and file entries that can be dynamically recreated from information stored in the encapsulated vdisk storage objects. The file entries include a vdisk filehandle 674 pertaining to a vdisk in the active file system and a backing store file handle 676 pertaining to a backing store (snapshot file). If the vdisk is used as a writable, read-only snapshot then the backing store file handle contains a file handle, including snapshot ID of the backing store file; otherwise, for a normal vdisk the backing store file handle contains a zero. The file entries of each record 672 may also contain directory information comprising a file block number in a parent directory (qtree root) containing an entry for the vdisk, along with an index of directory entries in a parent directory block. The directory entry enables determination of the last component of a path to the snapshot file.

The present invention involves writable, read-only snapshots, each of which comprises a read-only "image" (file) residing in a snapshot and a writable vdisk residing in the active file system. The writable vdisk is a "shadow" image of the snapshot file image and, as noted, includes an attribute that specifies the snapshot file as a backing store. It should be noted that while there are any vdisks in existence in the active file system specifying a file in a snapshot, the snapshot file is "locked" and cannot be deleted.

In the illustrative embodiment, a write operation directed to the writable read-only snapshot is "trapped" (directed) to the vdisk in the active file system such that the data associated with the operation is stored on that shadow, vdisk image. In other words rather than directly accessing the read-only snapshot image of a lun, a client accesses the writable vdisk image, which provides a translucent view of the underlying read-only snapshot image. The writable vdisk is a "sparse" file containing only that data written by the client (e.g., an initiator in a SAN) to the read-only snapshot image subsequent to a snapshot operation to a volume underlying the lun (vdisk).

Briefly, the sparse vdisk in the active file system is "translucent", i.e., initially the vdisk has a size equal to the size of the snapshot file because there is no data other than the snapshot file data. Since there is no data in the initial instance of the vdisk, the vdisk is completely filled with "holes." On read operations issued by a client to the writable read-only snapshot, the file system searches for the requested block in the vdisk of the active file system. If the block is not found, the corresponding block from the backing snapshot file is accessed and returned. It should be noted that having writable vdisks backed by a snapshot file does not prevent direct access to the snapshot file (for backup or other reasons).

Write operations are only carried out on the sparse vdisk in the active file system, i.e., the vdisk in the active file system stores changes (write data) to the read-only snapshot file. For subsequent read operations directed to the writable read-only snapshot, any modified/changed ("written") data blocks are returned. Otherwise, the holes in the vdisk result in copies of the read-only data blocks being returned from the associated snapshot file, thereby providing a "space conservative" storage entity.

For example, assume that a vdisk exists in its original state in the active file system and a snapshot is subsequently taken of the volume underlying that vdisk. Write operations can then be directed to that snapshotted vdisk. To that end, the writable read-only snapshot storage entity may be thought of as comprising two storage space layers: (i) an underlying snapshot layer that is "frozen in time" and that does not change as long as the snapshot file exists, and (ii) an overlaying vdisk layer of the active file system that does change in time as data is written to that layer.

Figure 9:
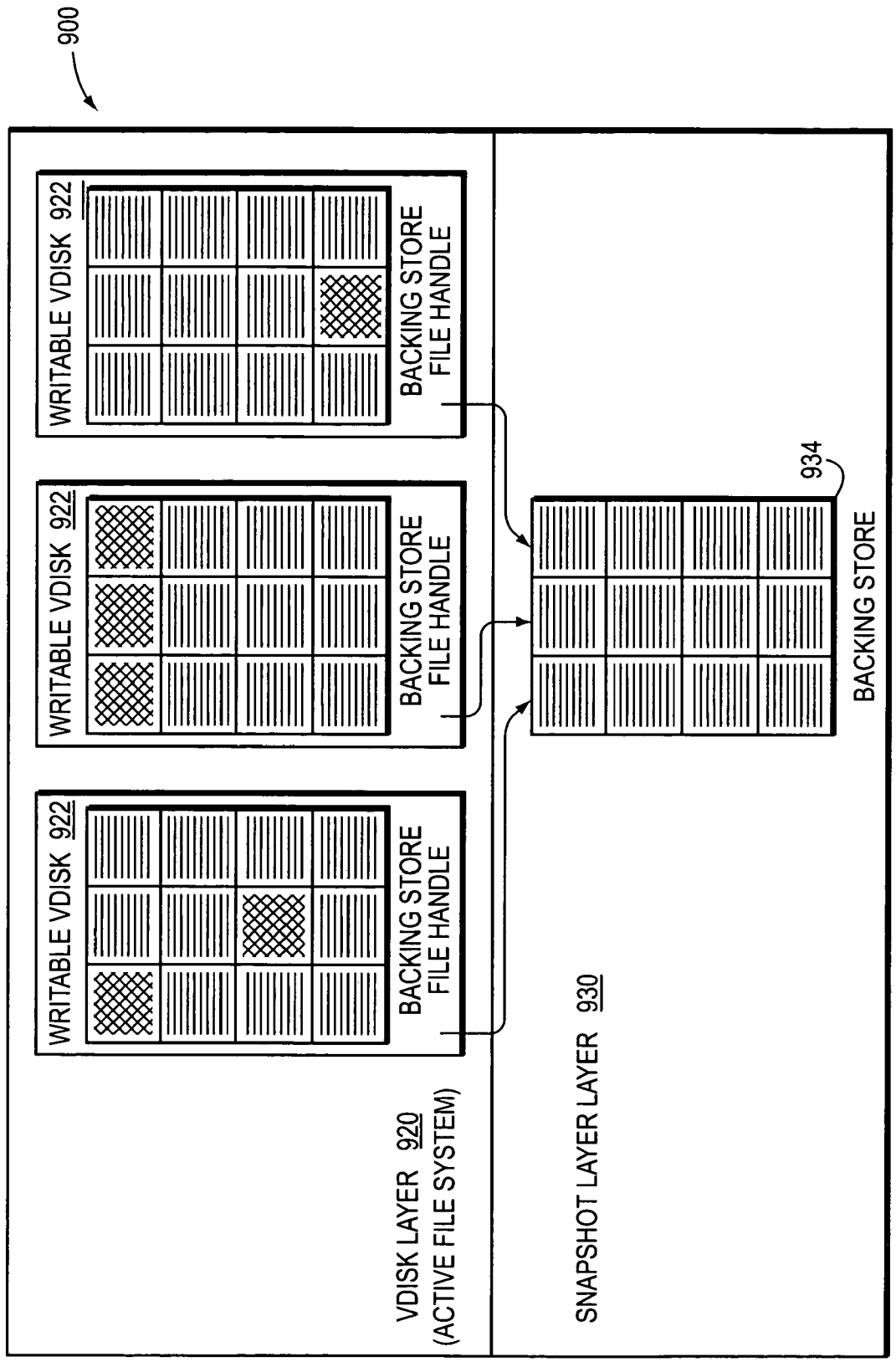
FIG. 9 is a schematic block diagram illustrating writable read-only snapshots, each comprising a writable virtual disk (vdisk) and a backing store, that may be advantageously used with the present invention.

FIG. 9 is schematic block diagram illustrating writable read-only snapshots 900, each comprising a writable vdisk and a backing store, that may be advantageously used with the present invention. An upper, overlaying vdisk layer 920 includes one or more writable vdisk storage objects 922 in the active file system. Each writable vdisk is backed by a snapshot file (backing store 934) in an underlying snapshot layer 930. Any modifications (data write operations) are directed to the vdisk layer 920 with new disk blocks being allocated to accommodate those modifications. Unmodified blocks of the vdisk layer are shared between the writable vdisk and underlying snapshot layer. For example, all data blocks with horizontal lines are shared between an instance of the special (vdisk) file in the active file system and an instance of the same file in the snapshot. Here, the VBNs point to, ie., reference, the same data blocks when they are shared between the instances of the active file and the snapshot file. In contrast, those data blocks in the active file system with hash marks indicate blocks that have been modified since the snapshot was taken. Consequently, those blocks are not shared with the instance of the vdisk file in the snapshot and are allocated VBNs that point to new blocks. In sum, each of the modified data blocks in each of the writable vdisks represents a newly allocated data block, whereas the unmodified data blocks of those vdisks are shared with corresponding data blocks of the snapshot file (backing store 934).

The present invention is directed to a LUN cloning technique that "separates" data blocks referenced by a writable vdisk in the active file system from data blocks referenced only by a backing store, thereby removing dependency of the writable vdisk upon the backing store. By separating the data blocks referenced by the writable vdisk, a user may then delete the backing store and free the disk space consumed by the backing store on the storage appliance.

Broadly stated, a backdoor message handler 626 of file system 620 loads blocks of the writable vdisk 922 and its backing store 934 from disk 130 into memory 424 (buffer cache 427) in a manner that does not interfere with storage service provided by the multi-protocol storage appliance. Notably, separation of the writable vdisk data blocks from the backing store occurs during periods of reduced processing activity in the file system, e.g., as part of background task processing on the appliance, so that the present technique may be implemented without any downtime visible to a client application served by the appliance. The loaded blocks are represented as writable vdisk and backing store buffer trees in the buffer cache 427 of the storage appliance.

Figure 10A:
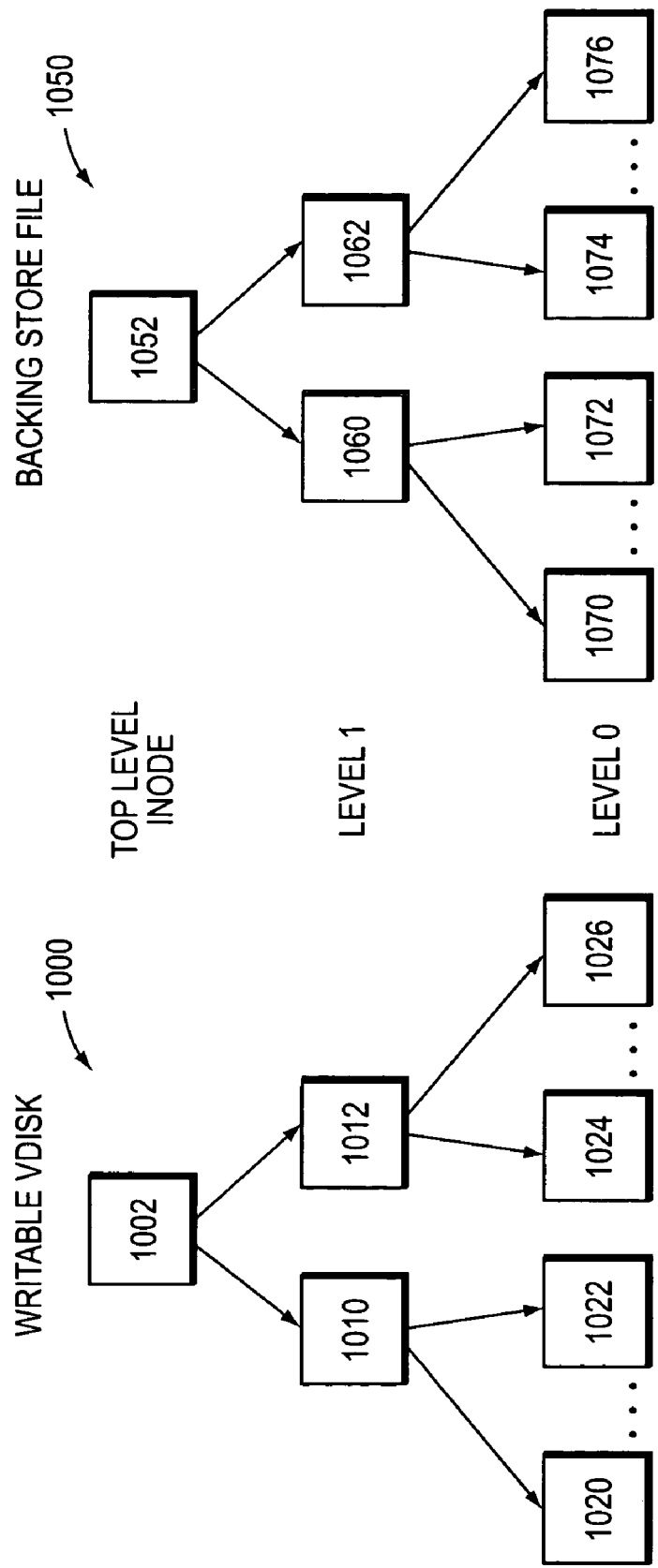
FIG. 10A is a schematic block diagram illustrating writable vdisk and backing store buffer trees that may be advantageously used with the present invention.
Figure 10B:
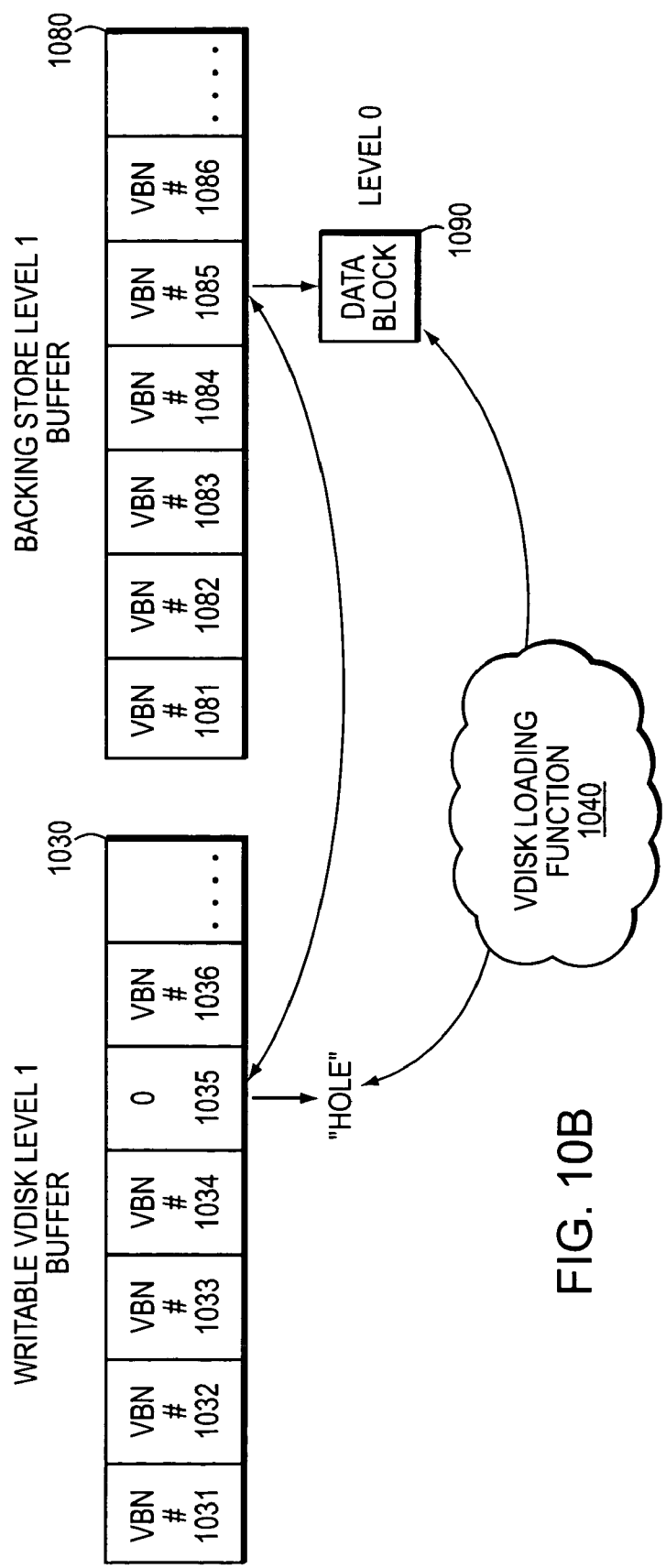
FIG. 10B is a schematic block diagram illustrating level 1 buffers for the writable vdisk and backing store that may be advantageously used with the present invention.

FIG. 10A is a schematic block diagram depicting the writable vdisk and backing store buffer tree data structures that may be advantageously used with the novel LUN cloning technique. The buffer trees 1000, 1050 are internal representations of the (data) blocks constituting the writable vdisk and the backing store and, to that end, function to organize their loaded blocks. The buffer trees are organized in a hierarchical structure with top level inodes 1002 and 1052 containing pointers to indirect blocks (level 1 blocks) 1010, 1012, 1060, 1062. The pointers are illustratively VBNs of a VBN space maintained by the file system. The indirect blocks contain VBN pointers to file data blocks (level 0 blocks), such as data blocks 1020, 1022, 1024, 1026, 1070, 1072, 1074, 1076. Each indirect block may be embodied as a level 1 buffer that stores the VBN's of the data blocks referenced by the indirect block. Moreover, each level 1 buffer has 1024 fields for storing the VBN pointers. FIG. 10B is a schematic block diagram illustrating level 1 buffers 1030, 1080 for the writable vdisk 922 and the backing store 934 respectively.

In the illustrative embodiment, a special vdisk loading function 1040 of the file system "walks through" the level 1 buffers (indirect blocks) of the writable vdisk, searching for invalid VBN pointers. Note that a valid VBN pointer has a non-zero value that directly references a data block, whereas an invalid VBN pointer has a zero value that represents a hole. Such a hole instructs the file system to examine the value of the VBN pointer in the corresponding level 1 buffer of the backing store.

For example, the vdisk loading function 1040 examines each field 1031-1035 of the writable vdisk level 1 buffer 1030 and, upon recognizing a hole at field 1035, examines field 1085 of the corresponding backing store level 1 buffer 1080. Note that the corresponding backing store level 1 buffer 1080 (e.g., indirect block 1060 of buffer tree 1050) has the same file block number (FBN) as the writable vdisk level 1 buffer 1030 (e.g., indirect block 1010 of buffer tree 1000). If the VBN pointer in field 1085 of the backing store level 1 buffer 1080 has a non-zero value, the loading function 1040 informs the backdoor message handler 626 to mark an "old" level 0 data block 1090 referenced by the non-zero VBN as "dirty", a designation normally indicating that the contents have been changed. In this case though the old data block is marked "dirty" without altering the content of the block.

Thereafter, a write allocator 628 of file system 620 "write allocates" the "dirty" block by, e.g., choosing a new VBN for a newly allocated block containing the unaltered data content, setting appropriate bits in block allocation structures and placing the chosen VBN into the writable vdisk indirect level 1 buffer, effectively filling the hole in the writable vdisk. Note that the block allocation structures include mapping data structures, such as an active map, a space map and a summary map, that are maintained by the file system and used by the write allocator as existing infrastructure for the volume. Block allocation data structures are described in U.S. Patent Application Publication No. US2002/0083037 A1, titled Instant Snapshot, by Blake Lewis et al. and published on Jun. 27, 2002, which application is hereby incorporated by reference.

The write allocator then deletes the old data block and stores the new block to disk. This process is repeated for all instances of holes discovered in the indirect blocks is of the writable vdisk. Thereafter, the file system "releases" an association of the writable vdisk to the backing store by, e.g., deleting the backing store file handle 846 from the attributes inode 840 of the writable vdisk. In addition, the file system updates an appropriate entry of record 672 in the VTOC 670 to remove the backing store file handle reference.

Figure 11:
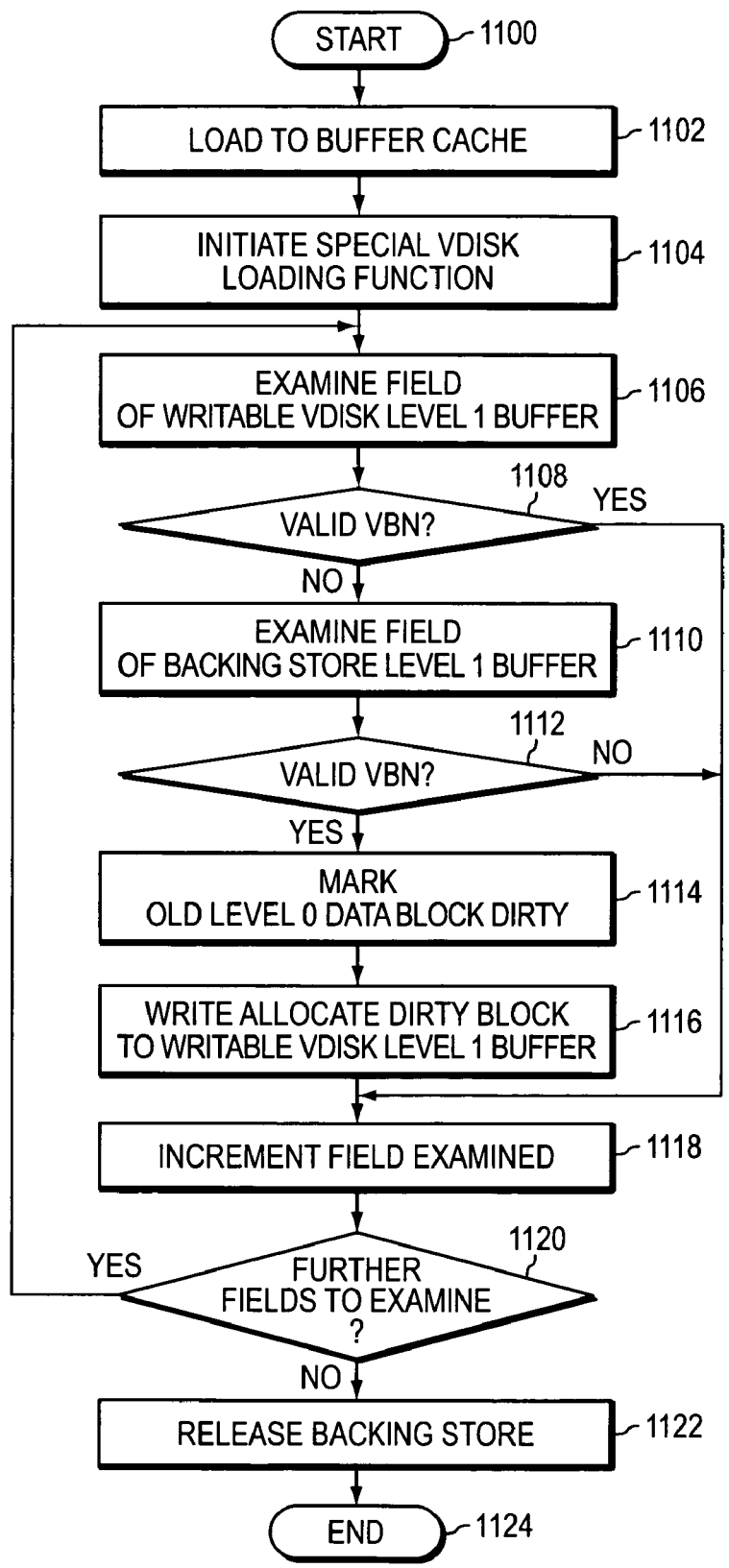
FIG. 11 is a flowchart illustrating a sequence of steps pertaining to a logical unit number (LUN) cloning technique of the present invention.

FIG. 11 is a flowchart illustrating a sequence of steps used to separate writable vdisk data blocks from their backing store in accordance with the present invention. The sequence of steps may be repeated for each level 1 buffer of the writable vdisk until all the data blocks of the vdisk have been separated. The sequence starts at 1100 and proceeds to Step 1102 where the message handler loads blocks of the writable vdisk 922 and its backing store 934 from disk 130 into buffer cache 427. Next, at Step 1104, the special vdisk loading function 1040 of the file system is invoked. The special vdisk loading function 1040 "walks through" the level 1 buffers of the writable vdisk, searching for invalid VBN pointers. At step 1106, the loading function examines a first field of the writable vdisk level 1 buffer and, in Step 1108, determines whether the field contains a valid (non-zero) VBN pointer. If a valid VBN pointer is found, the sequence advances to Step 1118 where the field to be examined of the writable vdisk level 1 buffer is incremented. Otherwise, if a non-valid value is present in the field of the writable vdisk level 1 buffer, indicating a hole, the sequence advances to Step 1110, where the loading function examines the corresponding field of the level 1 buffer of the backing store to determine if there is any backing data in the backing store (e.g. the backing store level 1 buffer field actually points to a data block). Specifically, at Step 1112 the loading function determines whether the corresponding field contains a valid VBN pointer. If not, the sequence jumps to step 1118 where the field to be examined of the writable vdisk level 1 buffer is incremented. Otherwise, the sequence advances to Step 1114 where the special loading function 1040 informs the backdoor message handler 626 to mark the level 0 data block (e.g. data block 1090) referenced by the backing store level 1 buffer as dirty. Thereafter, at Step 1116, the write allocator 628 of file system 620 "write allocates" the dirty block by, e.g., choosing a new VBN for the newly allocated block, setting appropriate bits in the block allocation structures and placing the chosen VBN into the writable vdisk indirect level 1 buffer, effectively filling the hole in the writable vdisk. At Step 1118 the field of the writable vdisk level 1 buffer to be examined is incremented and at Step 1120 a determination is made whether further fields of the writable vdisk level 1 buffer remain to be examined. If so the sequence returns to Step 1106; otherwise, at Step 1122 the file system "releases" the association of the writable vdisk to the backing store by, e.g., deleting the backing store file handle 846 from the attributes inode 840 of the writable vdisk. In addition, the file system updates an appropriate entry of record 672 in the VTOC 670 to remove the backing store file handle reference. The sequence then ends at Step 1124 where the backing store is deleted and the disk space consumed by the backing store is thereby effectively freed.

Advantageously, the inventive technique uses backdoor messaging (i.e., the exchange of messages during periods of reduced processing activity in the file system) to separate the writable vdisk data blocks from the backing store, thereby obviating the need to take the writable vdisk data blocks offline. The LUN cloning technique preferably takes place entirely in the background through the use of such backdoor messaging. Thus the LUN cloning technique results in zero-downtime of the multi-protocol storage appliance and is transparent to client applications served by the storage appliance.

Indeed, in some cases, if a client application attempts to write new data to the writable vdisk while lun cloning is running in the background, the write operation will speed up the lun cloning process. New data written to the writable vdisk decreases the number of holes and thereby decreases the number of VBN "lookups" that must be made to the backing store. Therefore, write activity may decrease the time it takes to "clone" the lun. Note that a further benefit of the novel cloning technique is that it enhances data read performance in certain situations. By separating the data blocks from the backing store to the writable vdisk, those data blocks may accessed without reference to the backing store. Elimination of this access operation enhances storage service performance.

The aforementioned novel LUN cloning technique may be initiated via user interface with a "lun clone" command. The "lun clone" command provides a human readable form for a user (system administrator) to specify a particular lun (vdisk) to be cloned, and provides status information to the user. The system administrator may issue the "lun clone" command through the UI 650 of the multi-protocol storage appliance 400, where it is converted to primitives 632 that are executed by the file system 620. To initiate the LUN cloning technique, a "start" option is used. An example of a "lun clone" command including a start option is:

lun clone start vol/vol0/test

In addition to the start option, the "lun clone" command includes a path descriptor (/vol/vol0) to a vdisk test in the active file system that is to be cloned from a snapshot.

During the cloning process, the system administrator or user may access status information to determine the progress of the cloning operation by issuing the "lun clone" command with a "status" option. For example, lun clone status vol/vol0/test returns completion information in the form of percentage of completion for the vdisk test.

The user may also access status information for all cloning operations by issuing the "lun clone" command with a "show" option. For example, lun clone show vol/vol0/ returns status information for all clones currently being processed for vdisks in the vol/vol0/path.

Finally, to terminate a LUN cloning operation while cloning is underway, the user may issue the "lun clone" command with a "stop" option. For example, lun clone stop vol/vol0/test terminates cloning of the vdisk test.

The foregoing description has been directed to specific embodiments of this invention. It will be apparent, however, that other variations and modifications may be made to the described embodiments, with the attainment of some or all of their advantages. For instance, it is expressly contemplated that the teachings of this invention can is be implemented as software, including a computer-readable medium having program instructions executing on a computer, hardware, firmware, or a combination thereof. Accordingly this description is to be taken only by way of example and not to otherwise limit the scope of the invention. Therefore, it is the object of the appended claims to cover all such variations and modifications as come within the true spirit and scope of the invention.

What is claimed is:

1. A method for operating a data storage system, comprising:

creating a writable virtual disk (vdisk) at a selected time, the writable vdisk referencing changes in data stored in the data storage system after the writable vdisk was created;

maintaining a backing store, the backing store referencing data stored in the data storage system which has not been changed since the writable vdisk was created;

loading blocks of the writable vdisk into a memory, the loaded writable vdisk blocks including a writable vdisk indirect block having a plurality of fields, each writable vdisk indirect block field storing a valid pointer to a writable vdisk data block or an invalid pointer representing one of a plurality of holes, where each hole instructs the data storage system to examine a corresponding virtual block number pointer in the backing store;

loading blocks of the backing store into the memory, the loaded backing store blocks including a backing store indirect block having a plurality of fields, each backing store indirect block field corresponding to a writable vdisk indirect block field, one or more backing store indirect block fields having a pointer to a backing store data block;

searching each field of the writable vdisk indirect block for a hole; and filling each hole in the writable vdisk by replacing each invalid pointer with a pointer to the backing store data block referenced by the corresponding backing store indirect block field to update the writable vdisk to reference both the data which is unchanged since the writable vdisk was created and the data which has been changed since the writable vdisk was created.

2. The method of claim 1, further comprising:

dirtying the backing store data block pointed to by the backing store indirect block to enable write allocation of the dirty backing store data block without altering a data content of the backing store data block.

3. The method of claim 2, further comprising:

choosing a new pointer for a newly allocated data block containing an unaltered data content;

setting bits in block allocation structures for the newly allocated data block; and placing the new pointer to the newly allocated data block into the field of the writable vdisk indirect block to replace the hole.

4. The method of claim 3 further comprising:
freeing the dirty backing store data block; and
writing the newly allocated data block to disk.

5. The method of claim 4 further comprising:
releasing an association of the writable vdisk to the backing store to thereby separate the writable vdisk block from the backing store blocks.

6. The method of claim 1 wherein the pointers contained in the writable vdisk indirect block fields and the backing store indirect block fields comprise logical volume block numbers (VBNs).

7. The method of claim 1 wherein the invalid pointers contained in the writable vdisk indirect block field comprises a zero logical volume block number (VBN).

8. The method of claim 1 wherein the plurality of fields in the writable vdisk indirect block are a writable vdisk level 1 buffer and the plurality of fields in the backing store indirect block are a backing store level 1 buffer.

9. An apparatus for operating a computer database, comprising:
a writable virtual disk (vdisk) created at a selected time, the writable vdisk referencing changes in data stored in a data storage system after the writable vdisk was created;
a backing store, the backing store referencing data stored in the data storage system which has not been changed since the writable vdisk was created;
a backdoor message handler that loads blocks of the writable vdisk and backing store from disk into a memory of the storage system;
a writable vdisk indirect block in the memory having a plurality of fields, each writable vdisk field storing a valid pointer to a writable vdisk data block or an invalid pointer representing one of a plurality of holes, where each hole instructs the data storage system to examine a corresponding virtual block number pointer in the backing store;
a backing store indirect block in the memory having a plurality of fields, each backing store indirect block field corresponding to a writable vdisk indirect block field, each backing store indirect block field having a pointer to a backing store data block;
a special loading function that searches each field of the writable vdisk indirect block for one or more fields representing a hole; and
a write allocator that fills each hole in the writable vdisk by replacing each invalid pointer with a pointer to the backing store data block referenced by the corresponding backing store indirect block field to update the writable vdisk to reference both the data which is unchanged since the writable vdisk was created and the data which has been changed since the writable vdisk was created.

10. The apparatus of claim 9 wherein the write allocator further chooses a new pointer for a newly allocated data block containing an unaltered data content, set bits in block allocation structures for the newly allocated data block, and place the new pointer to the newly allocated data block into the field of the writable vdisk indirect block to replace the hole.

11. The apparatus of claim 10 wherein the write allocator further frees the backing store data block and writes the newly allocated data block to disk.

12. The apparatus of claim 9 wherein the backdoor message handler further loads the blocks of the writable vdisk and the blocks of the backing store during periods of reduced processing activity.

13. The apparatus of claim 9 wherein the pointers contained in the writable vdisk indirect block fields and pointers in backing store indirect block fields comprise logical volume block numbers (VBNs).

14. The apparatus of claim 9 wherein the invalid pointer contained in the writable vdisk indirect block field comprise a zero logical volume block number (VBN).

15. The apparatus of claim 9 wherein the plurality of fields in the writable vdisk indirect block comprise a writable vdisk level 1 buffer and the plurality of fields in the backing store indirect block comprise a backing store level 1 buffer.

16. A data storage system apparatus, comprising:
means for creating a writable virtual disk (vdisk) at a selected time, the writable vdisk referencing changes in data stored in the data storage system after the writable vdisk was created;
means for maintaining a backing store, the backing store referencing data stored in the data storage system which has not been changed since the writable vdisk was created;
means for loading blocks of the writable vdisk from a disk into a memory, the loaded writable vdisk blocks including a writable vdisk indirect block having a plurality of fields, each writable vdisk field storing a valid pointer to a writable vdisk data block or an invalid pointer representing one of a plurality of holes, where each hole instructs the data storage system to examine a corresponding virtual block number pointer in the backing store;
means for loading blocks of the backing store from a disk into the memory, the loaded backing store blocks including a backing store indirect block having a plurality of fields, each backing store indirect block field corresponding to a writable vdisk indirect block field, one or more backing store indirect block fields having a pointer to a backing store data block;
means for searching each field of the writable vdisk indirect block for a hole; and
means for filling each hole in the writable vdisk by replacing each invalid pointer with a pointer to the backing store data block referenced by the corresponding backing store indirect block field to update the writable vdisk to reference both the data which is unchanged since the writable vdisk was created and the data which has been changed since the writable vdisk was created.

17. A non-transitory computer readable medium executable program instructions executed by a processor, comprising:
program instructions that create a writable virtual disk (vdisk) at a selected time, the writable vdisk referencing changes in data stored in a data storage system after the writable vdisk was created;
program instructions that maintain a backing store, the backing store referencing data stored in the data storage system which has not been changed since the writable vdisk was created;
program instructions that load blocks of the writable vdisk from a disk into a memory, the loaded writable vdisk blocks including a writable vdisk indirect block having a plurality of fields, each writable vdisk field storing a valid pointer to a writable vdisk data block or an invalid pointer representing one of a plurality of holes, where each hole instructs the data storage system to examine a corresponding virtual block number pointer in the backing store;
program instructions that load blocks of the backing store from a disk into the memory, the loaded backing store blocks including a backing store indirect block having a plurality of fields, each backing store indirect block field corresponding to a writable vdisk indirect block field, one or more backing store indirect block fields having a pointer to a backing store data block;
program instructions that search each field of the writable vdisk indirect block for a hole; and
program instructions that fill each hole in the writable vdisk by replacing each invalid pointer with a pointer to the backing store data block referenced by the corresponding backing store indirect block field to update the writable vdisk to reference both the data which is unchanged since the writable vdisk was created and the data which has been changed since the writable vdisk was created.

18. A method for operating a data storage system, comprising:
creating a writable virtual disk (vdisk) at a selected time, the writable vdisk referencing changes in data stored in the data storage system after the writable vdisk was created, the writable vdisk having a plurality of holes where each hole instructs the storage system to examine a corresponding virtual block number pointer in a backing store;
maintaining the backing store, the backing store referencing the data stored in the data storage system which has not been changed since the writable vdisk was created;
searching each field of the writable vdisk for a hole; and
filling each hole in the writable vdisk by replacing each hole in the writable vdisk to point to a data block referenced by a corresponding backing store indirect block of the backing store to fill each hole of the writable vdisk with the data block referenced by the corresponding backing store indirect block and thus update the writable vdisk to reference both the data which is unchanged since the writable vdisk was created and the data which has been changed since the writable vdisk was created.

19. The method of claim 18, further comprising:
dirtying the data block pointed to by the backing store indirect block to enable write allocation of the dirty data block without altering a data content of the data block.

20. The method of claim 19 further comprising:
choosing a new pointer for a newly allocated data block containing an unaltered data content;
setting bits in block allocation structures for the newly allocated data block; and
placing the new pointer to the newly allocated data block into a field of a writable vdisk indirect block to replace the hole.

21. The method of claim 20, further comprising:
freeing the dirty data block; and
writing the newly allocated data block to disk.

22. The method of claim 21 further comprising:
releasing an association of the writable vdisk to the backing store to thereby separate writable vdisk blocks from backing store blocks.

23. The method of claim 18, further comprising:
including logical volume block numbers (VBNs) in pointers contained in a writable vdisk indirect block field of the writable vdisk and a backing store indirect block field of the backing store.

24. The method of claim 23, further comprising:
using a zero logical volume block number (VBN) as an invalid pointer contained in the hole of the writable vdisk indirect block field.

25. The method of claim 18, further comprising:
using a writable vdisk level 1 buffer for a plurality of fields in a writable vdisk indirect block of the writable vdisk and using a backing store level 1 buffer for a plurality of fields in the backing store indirect block.

26. A data storage system, comprising:
a writable virtual disk (vdisk) created at a selected time, the writable vdisk referencing changes in data stored in the data storage system after the writable vdisk was created, the writable vdisk having a plurality of holes, each hole instructing the storage system to examine a corresponding virtual block number pointer in a backing store;
the backing store referencing data stored in the data storage system which has not been changed since the writable vdisk was created;
a processor that searches each field of the writable vdisk for a hole; and
the processor that fills each hole in the writable vdisk so that each hole in the writable vdisk points to a data block referenced by a corresponding backing store indirect block to fill each hole of the writable vdisk with the data block referenced by the corresponding backing store indirect block and thus update the writable vdisk to reference both the data which is unchanged since the writable vdisk was created and the data which has been changed since the writable vdisk was created.

27. The system of claim 26, wherein the processor further dirties the data block pointed to by the backing store indirect block to enable write allocation of the dirty data block without altering a data content of the data block.

28. The system of claim 27 wherein the processor further:
chooses a new pointer for a newly allocated data block containing an unaltered data content;
sets bits in block allocation structures for the newly allocated data block; and
places a new pointer to the newly allocated data block into a field of the writable vdisk indirect block to replace the hole.

29. The system of claim 28, wherein the processor further:
frees the dirty data block; and
writes the newly allocated data block to disk.

30. The system of claim 29 wherein the processor further releases an association of the writable vdisk to the backing store to thereby separate writable vdisk blocks from backing store blocks.

31. The system of claim 26, wherein the processor further has logical volume block numbers (VBNs) included in pointers contained in a writable vdisk indirect block field and a backing store indirect block field of a backing store.

32. The system of claim 31, wherein the processor further uses a zero logical volume block number (VBN) as an invalid pointer in the hole contained in the writable vdisk indirect block field.

33. The system of claim 26, wherein the processor further uses a writable vdisk level 1 buffer for a plurality of fields in a writable vdisk indirect block of the writable vdisk and use a backing store level 1 buffer for a plurality of fields in the backing store indirect block.

34. A non-transitory computer readable medium containing executable program instructions executed by a processor comprising:
program instructions that create a writable virtual disk (vdisk) at a selected time, the writable vdisk referencing changes in data stored in the data storage system after the writable vdisk was created, the writable vdisk having a plurality of holes where each hole instructs the storage system to examine a corresponding virtual block number pointer in a backing store;
program instructions that maintain the backing store, the backing store referencing data stored in the data storage system which has not been changed since the writable vdisk was created;
program instructions that search each field of the writable vdisk for a hole; and
program instructions that fill each hole in the writable vdisk to point to a data block referenced by a corresponding backing store indirect block to fill each hole of the writable vdisk with the data block referenced by the corresponding backing store indirect block and thus update the writable vdisk to reference both the data which is unchanged since the writable vdisk was created and the data which has been changed since the writable vdisk was created.

35. A method for operating a data storage system, comprising:
creating a writable virtual disk (vdisk) at a selected time, the writable vdisk referencing changes in data stored in the data storage system after the writable vdisk was created, the writable vdisk having a plurality of holes where each hole instructs the data storage system to examine a corresponding virtual block number pointer in a backing store;
maintaining the backing store, the backing store referencing the data stored in the data storage system which has not been changed since the writable vdisk was created;
searching, by a background task process, each field of the writable vdisk for a hole;
for each hole in the writable vdisk, marking as dirty a corresponding data block pointed to by a backing store indirect block without modifying the corresponding data block; and
performing a write allocation to replace each hole in the writable vdisk to point to the data block marked as dirty and referenced by the corresponding backing store indirect block to update the writable vdisk to reference both the data which is unchanged since the writable vdisk was created and the data which has been changed since the writable vdisk was created.

36. A data storage system, comprising:
a writable virtual disk (vdisk) created at a selected time, the writable vdisk referencing changes in data stored in the data storage system after the writable vdisk was created, the writable vdisk having a plurality of holes where each hole instructs the data storage system to examine a corresponding virtual block number pointer in the backing store;
the backing store referencing the data stored in the data storage system which has not been changed since the writable vdisk was created;
a background task processor that searches each field of the writable vdisk for a hole; and
the background task processor that marks as dirty, for each hole in the writable vdisk, a corresponding data block pointed to by a backing store indirect block without modifying the corresponding data block, and performs a write allocation to replace each hole in the writable vdisk to point to the data block marked as dirty and referenced by the corresponding backing store indirect block to update the writable vdisk to reference both the data which is unchanged since the writable vdisk was created and the data which has been changed since the writable vdisk was created.

37. A non-transitory computer readable containing executable program instructions executed by a processor, comprising:
program instructions that create a writable virtual disk (vdisk) at a selected time, the writable vdisk referencing changes in data stored in the data storage system after the writable vdisk was created, the writable vdisk having a plurality of holes where each hole instructs the data storage system to examine a corresponding virtual block number pointer in a backing store;
program instructions that maintain the backing store, the backing store referencing the data stored in the data storage system which has not been changed since the writable vdisk was created;
program instructions that search, by a background task process, each field of the writable vdisk for a hole;
program instructions that mark as dirty, for each hole in the writable vdisk, a corresponding data block pointed to by a backing store indirect block without modifying the corresponding data block; and
program instructions that perform a write allocation to replace each hole in the writable vdisk to point to the data block marked as dirty and referenced by the corresponding backing store indirect block to update the writable vdisk to reference both the data which is unchanged since the writable vdisk was created and the data which has been changed since the writable vdisk was created.

* * * * *

UNITED STATES PATENT AND TRADEMARK OFFICE
CERTIFICATE OF CORRECTION

PATENT NO. : 8,041,888 B2
APPLICATION NO. : 10/772822
DATED : October 18, 2011
INVENTOR(S) : Vijayan Rajan Page 1 of 1

It is certified that error appears in the above-identified patent and that said Letters Patent is hereby corrected as shown below:

Col. 5, line 32 should read: "blocks ~~is~~ from the backing store occurs without interrupting"

Col. 10, line 21 should read: "block and file access ~~is~~ protocols. The protocol stack includes"

Col. 16, line 29 should read: "instances of holes discovered in the indirect blocks ~~is~~ of the"

Col. 18, line 17 should read: "that the teachings of this invention can ~~is~~ be implemented as"

Col. 19, line 17 should read: "The method of claim 1 wherein the invalid ~~pointers~~ pointer"

Col. 19, line 61 should read: "containing ~~an~~ unaltered data content, set bits in block alloca-"

Col. 22, lines 52-53 should read: "ers contained in a writable vdisk indirect block field <u>of the writable vdisk</u> and a backing store indirect block field of ~~a~~<u>the</u> backing store."

Col. 24, line 21 should read: "A non-transitory computer readable <u>medium</u> containing execut-"

Signed and Sealed this
Thirteenth Day of March, 2012

David J. Kappos
*Director of the United States Patent and Trademark Office*